United States Patent [19]

Duhame

[11] Patent Number: 5,218,282
[45] Date of Patent: Jun. 8, 1993

[54] AUTOMATIC DOOR OPERATOR INCLUDING ELECTRONIC TRAVEL DETECTION

[75] Inventor: Dean Duhame, Roseville, Mich.

[73] Assignee: Stanley Home Automation, Novi, Mich.

[21] Appl. No.: 496,796

[22] Filed: Mar. 22, 1990

[51] Int. Cl.⁵ .......................................... H02K 27/30
[52] U.S. Cl. ..................... 318/603; 318/434; 318/468; 318/466; 318/470
[58] Field of Search ...................... 318/268–293, 318/560–640, 430–434, 16, 267, 266, 480, 469; 49/25, 360, 280, 167, 194, 199, 357, 358, 59

[56] References Cited

U.S. PATENT DOCUMENTS

| | | | |
|---|---|---|---|
| 4,234,833 | 11/1980 | Barrett | 318/282 |
| 4,328,540 | 5/1982 | Matsuoka et al. | 364/167 |
| 4,338,553 | 7/1982 | Scott, Jr. | 318/266 |
| 4,364,111 | 12/1982 | Jocz | 318/466 X |
| 4,365,250 | 12/1982 | Matsuoka et al. | 318/266 X |
| 4,383,206 | 5/1983 | Matsuoka et asl. | 318/445 |
| 4,394,607 | 7/1983 | Lemirande | 318/469 X |
| 4,408,146 | 10/1983 | Beckerman | 318/466 |
| 4,429,264 | 4/1984 | Richmond | 318/466 |
| 4,445,075 | 4/1984 | Fry | 318/283 X |
| 4,468,596 | 8/1984 | Kinzl et al. | 318/287 |
| 4,475,069 | 10/1984 | Tadokoro et al. | 318/265 |
| 4,563,625 | 1/1986 | Kornbrekke et al. | 318/603 |
| 4,585,981 | 4/1986 | Zintler | 318/615 |
| 4,625,291 | 11/1986 | Hormann | 318/265 |
| 4,638,433 | 1/1987 | Schindler | 364/400 |
| 4,673,848 | 6/1987 | Hagiwara et al. | 318/266 |
| 4,701,684 | 1/1987 | Seidel et al. | 318/282 |
| 4,794,309 | 12/1988 | Saito et al. | 318/466 X |
| 4,831,509 | 5/1989 | Jones et al. | 364/167.01 |
| 4,887,205 | 12/1989 | Chou | 364/400 |
| 4,922,168 | 5/1990 | Waggamon et al. | 318/286 |

*Primary Examiner*—Paul Ip
*Attorney, Agent, or Firm*—Krass & Young

[57] ABSTRACT

The present invention is an automatic door operator which includes an obstruction detector for at least stopping the motor when the detected motor speed indicates a motor torque greater than the selected closing torque limit while closing the door, and for at least stopping the motor when the detected motor speed indicates a motor torque greater than the selected opening torque limit while opening the door. The motor speed is detected based upon a predetermined count of electrical pulses corresponding to motor shaft rotation in order smooth noise. Selection of the number of pulses per rotation enables the same controller to control motors operating on either 60 Hz or 50 Hz power. A travel count of rotation pulses permits identification of a plurality of regions in the opening and closing travel of the door and corresponding adaptive torque limits. The travel counter may also be employed for detection of the fully opened and fully closed limits. The controller can be used to control either a four-pole motor or a six-pole motor via a manual motor type selection switch, which selects a torque limit table.

53 Claims, 11 Drawing Sheets

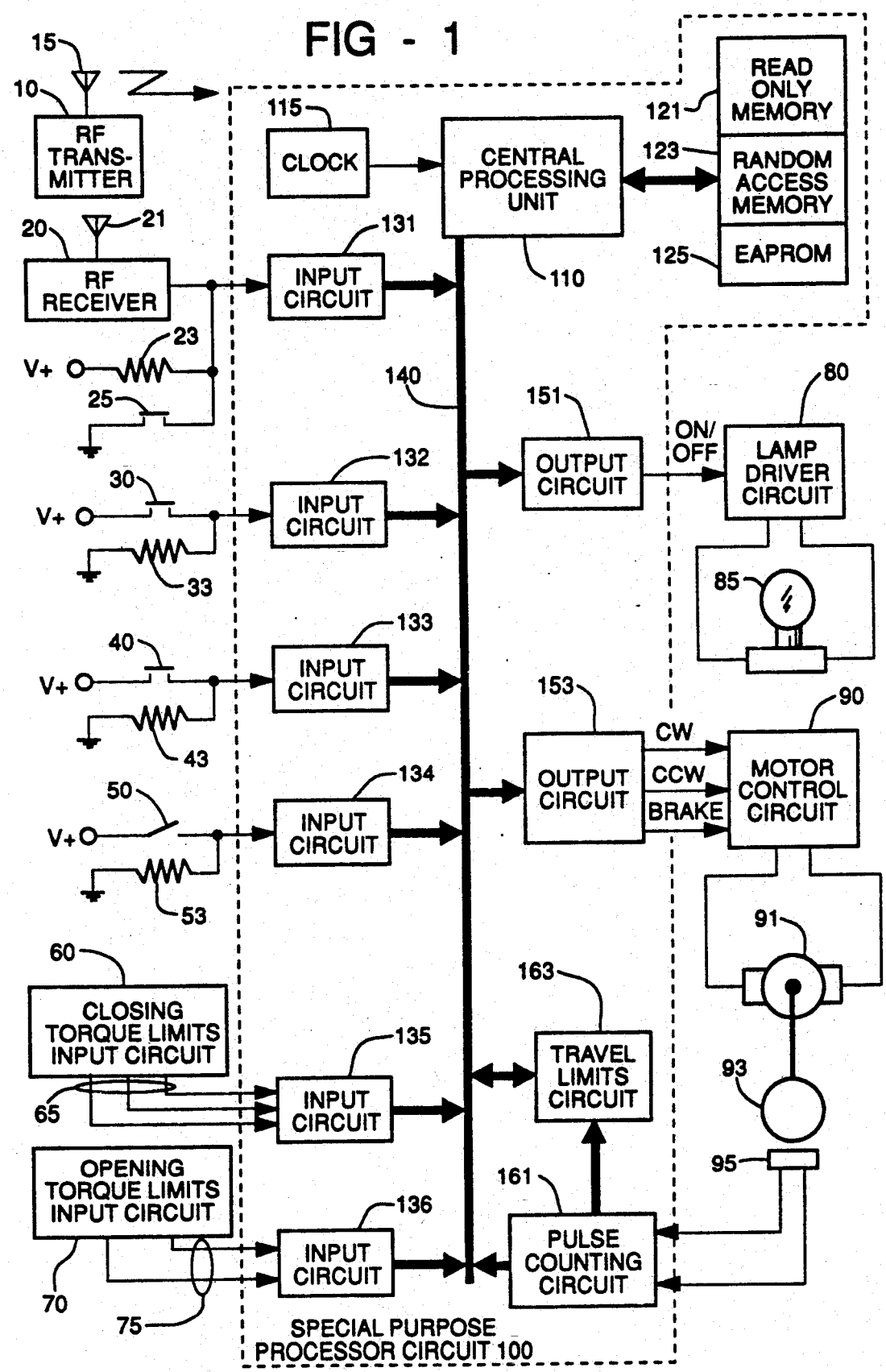

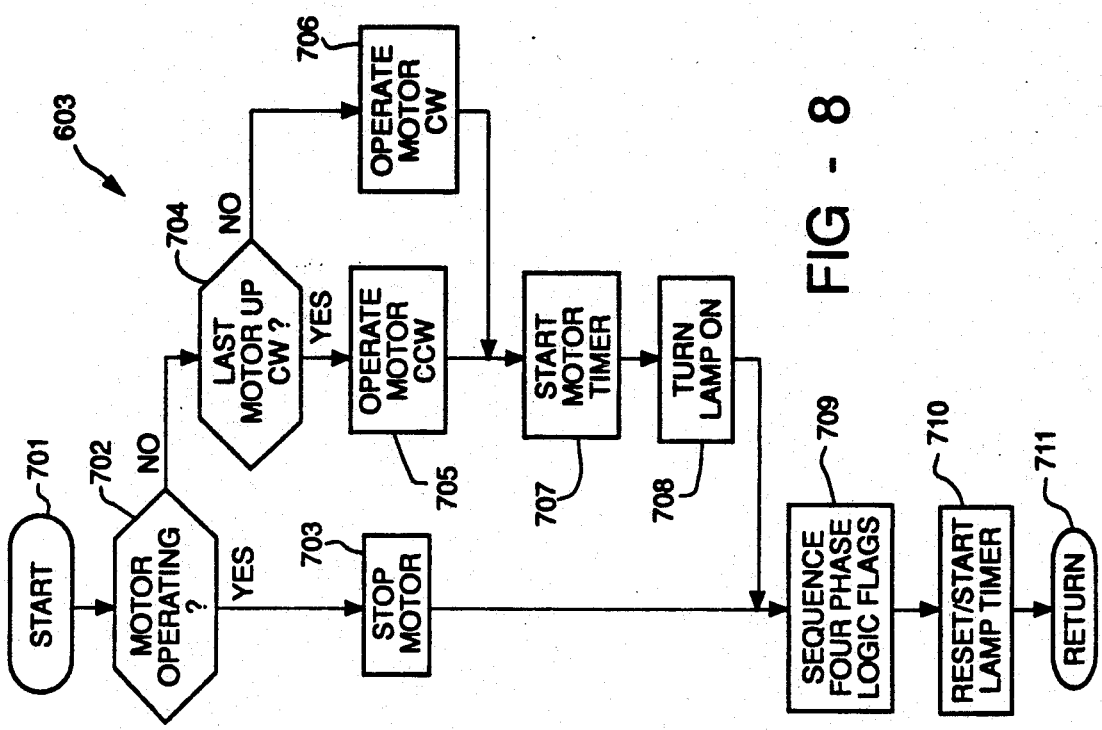
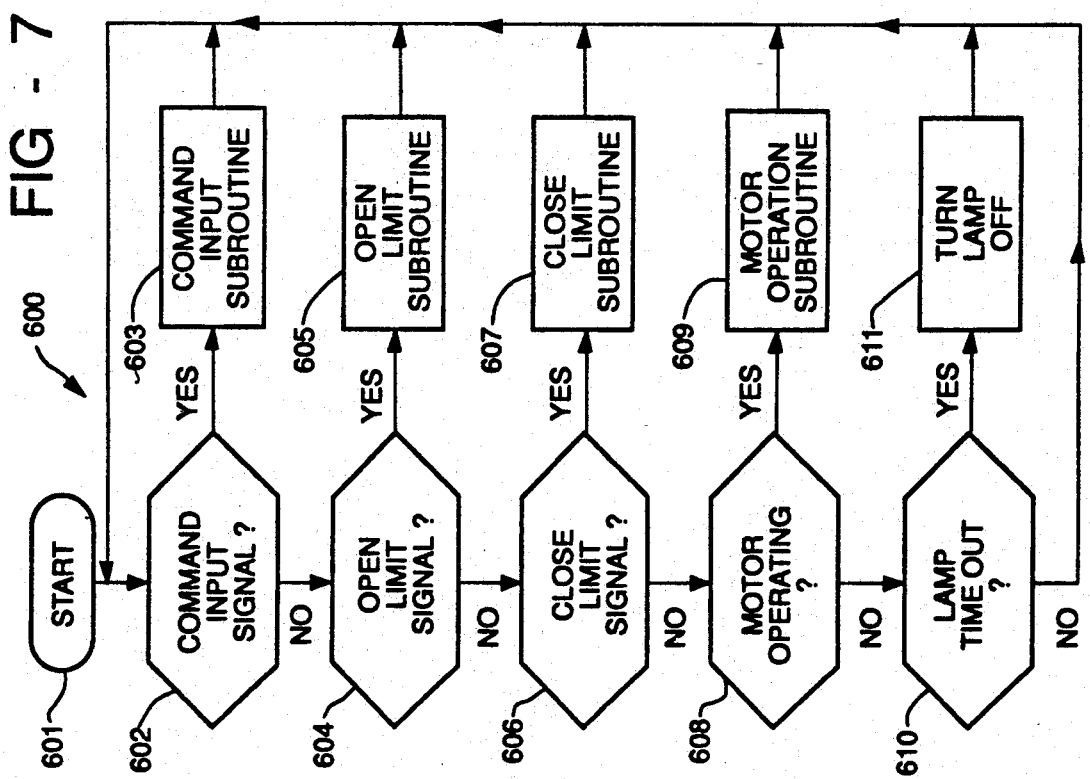
FIG - 8
FIG - 7

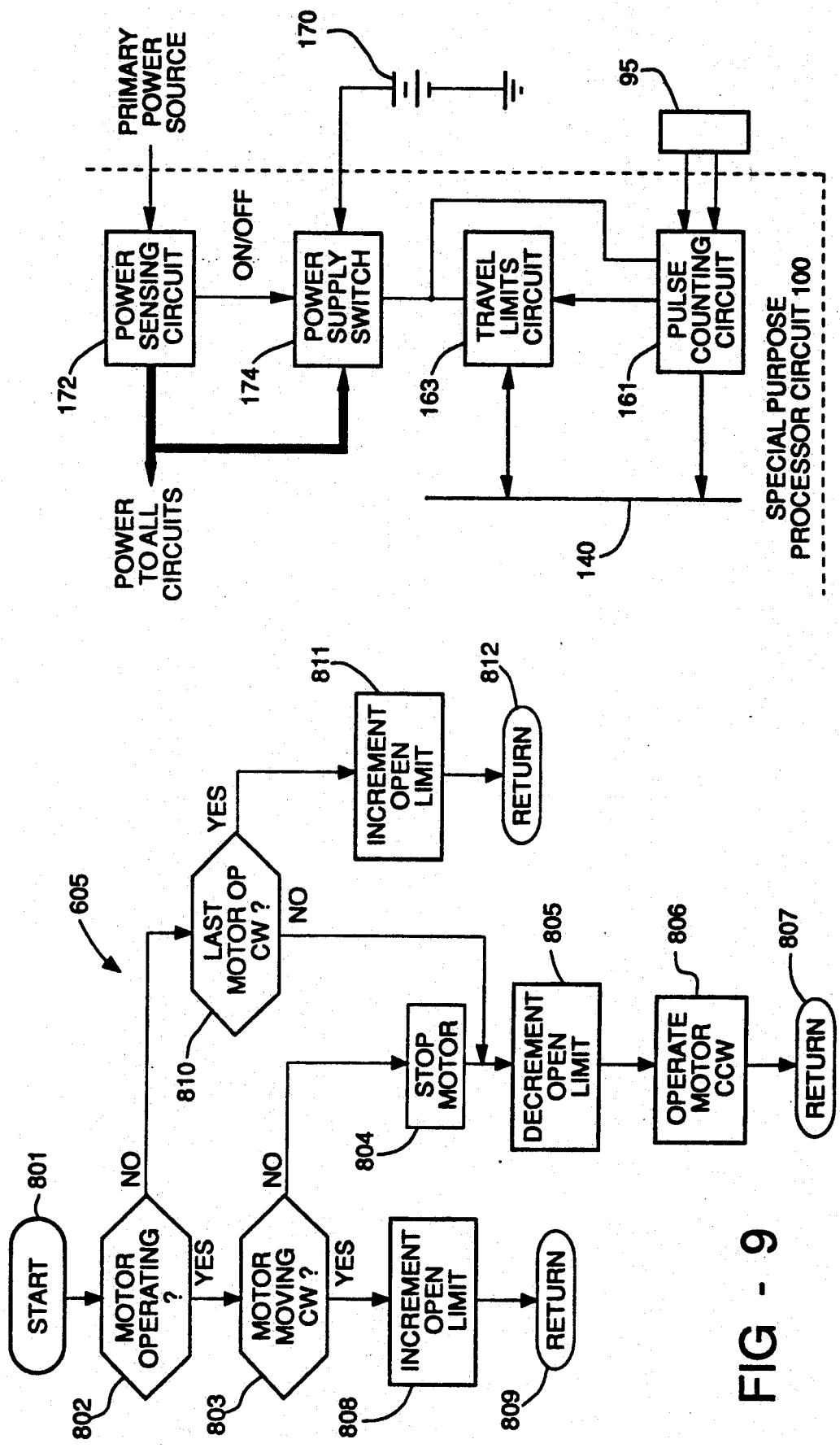

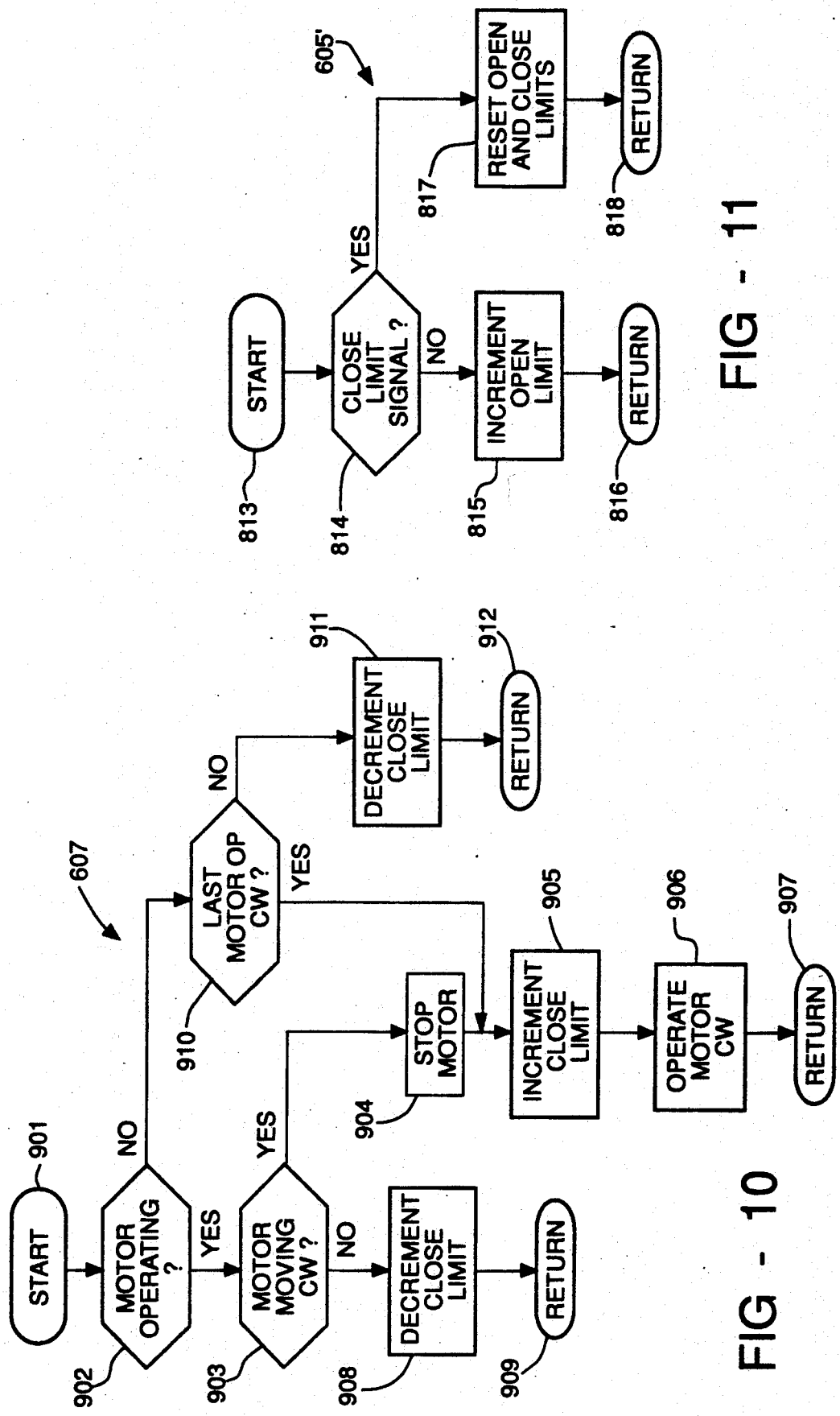

AUTOMATIC DOOR OPERATOR INCLUDING ELECTRONIC TRAVEL DETECTION

TECHNICAL FIELD OF THE INVENTION

The technical field of the present invention is automatic door operators, such as typically employed for residential garage doors, and particularly such automatic door operators which electronically detect the door travel for electronic obstruction detection and/or electronic opening and closing limit detection.

BACKGROUND OF THE INVENTION

Automatic door operators for residential garage doors are known in the art. The typical prior art system includes a portable radio frequency transmitter which can be disposed in the user's automobile. It is also typical to include a permanently mounted momentary contact pushbutton switch within the garage for control of the garage door.

The typical pattern of use is as follows. The user enters the garage and opens the closed garage door by momentary depression of the pushbutton switch. The automatic door operator moves the garage door from the fully closed position to the fully opened position. The automatic door operator includes some mechanism for detection of when the door has reached this fully opened position to stop the door. The user enters his automobile, starts it and then leaves the garage. After clearing the garage door, the user presses a momentary contact pushbutton on the portable radio frequency transmitter. This transmits an encoded signal to the automatic door operator. The automatic door operator determines whether or not the received radio frequency signal is correctly encoded for that particular automatic door operator. If this is the case, then the automatic door operator closes the door and stops when the fully closed position is detected. When the user returns, the process is reversed. The user presses the pushbutton switch on the portable radio frequency transmitter, the automatic garage door operator opens the door allowing the user to park his automobile within the garage. Then the user exits the automobile and closes the garage door by momentary actuation of the garage mounted pushbutton. The typical automatic door operator also enables the operator to stop movement of the door when it is partially opened or partially closed by additional activation of either the pushbutton switch or the portable radio frequency transmitter.

All such automatic door operators are required to solve two types of problems during their control operation. Firstly, the automatic door operator needs some manner of detecting when the door has reached the fully opened or the fully closed position. Secondly, the automatic door operator needs some manner of determining when the door has encountered an obstructing object during its operation. In older automatic door operators these functions were carried out employing mechanical switches. An open switch and a close switch coupled in some manner to the drive train of the automatic door operator were tripped when the door reached their respective positions An obstruction was detected when a tension sensitive mechanical switch connected to the drive train of the automatic door operator detected greater than a predetermined amount of force applied to the door.

In recent years there has been interest in control of the obstruction and limit functions electronically. This interest is driven by the great reduction in the expense of electronic controllers, coupled with their greater versatility as compared to mechanical controllers. The typical electronic controller of the prior art includes some manner of detection of shaft rotation of the motor which drives the door. This typically takes places by detection of pulses produced by motor shaft rotation. The rate of generation of these rotation pulses is a measure of the speed of door travel. In a typical installation the torque developed by the motor driving the door is inversely proportional to the motor speed. Electronic obstruction detection has heretofore detected whether or not the motor speed is less than a predetermined speed corresponding to the greatest permitted torque. This greatest permitted torque is set greater than the torque required for ordinary operation of the door but less than a damaging torque. Open and close limit detection takes place by comparison of a count of these shaft rotation pulses with numbers corresponding to the respective limit positions.

There remains some problems in implementing the electronic limit detection and electronic obstruction detection in accordance with the prior art. It is not heretofore known how to easily select a particular torque limit value for a particular installation. It is also heretofore not known how to easily adjust the open and closed limit numbers for a particular garage door installation. Automatic door operators such as typically employed for residential garage doors are manufactured in large numbers and typically a single electronic controller must be capable of installation in a variety of settings. Thus, it would be useful in the art to provide a convenient means for setting the torque obstruction limits and setting the travel limits in such automatic door operators.

SUMMARY OF THE INVENTION

The present invention is an automatic door operator for controlling a motor coupled for closing and opening a door. This automatic door operator includes a motor speed detector, and input devices for selecting a closing torque limit and an opening torque limit. The automatic door operator further includes a controller for controlling motor operation. This controller has an obstruction detector for at least stopping the motor when the detected motor speed indicates a motor torque greater than the selected closing torque limit while closing the door, and for at least stopping the motor when the detected motor speed indicates a motor torque greater than the selected opening torque limit while opening the door. In the preferred embodiment there are eight possible closing torque limits and four possible opening torque limits which are manually selectable upon installation of the automatic door operator. In an alternative embodiment, the opening and closing torque limits are determined by the manually adjustable position of a potentiometer.

The motor speed detector is based upon electrical pulses generated corresponding to rotation of the shaft of the motor. In the preferred embodiment a rotating multipole magnet triggers pulse production by a pair of Hall effect devices. A counter connected to the pulse generator counts a predetermined number of these electrical pulses in order smooth noise due to differences in the magnetic pole strength and differences in the angle between poles.

The controller of the automatic door operator is preferably capable of controlling motors operating on either 60 Hz AC power or 50 Hz AC power. The number of pulses per revolution is set 20% higher when operating on 50 Hz power. This is achieved by, for example, employing a 10 pole magnet when operating on 60 Hz power and a 12 pole magnet when operating on 50 Hz power. The multipole magnet installed in a particular automatic door operator is selected with the number of poles corresponding to the expected power frequency.

The automatic door operator further includes a travel counter for counting the rotation pulses. In one embodiment of the invention, this travel count permits identification of a plurality of regions in the opening and closing travel of the door. An adaptive closing torque limit memory stores an adaptive closing torque limit for each region of closing travel. Likewise, an adaptive opening torque limit memory stores an adaptive opening torque limit for each region of opening travel. The obstruction detector determines the current region of closing or opening travel from the travel count. An obstruction is detected when closing if the detected motor speed indicates a motor torque greater than the lesser of the operator selected closing torque limit or the adaptive closing torque limit for the current region of door closing travel. Likewise, an obstruction is detected when opening if the detected motor speed indicates a motor torque greater than the lesser of the operator selected opening torque limit and the adaptive opening torque limit for the current region of door opening travel. The respective adaptive torque limits are updated based upon the weighted sum of the prior adaptive torque limit for the corresponding region and the actual torque corresponding to the average motor speed for that region.

In an alternative embodiment, the above described adaptive torque limits are replaced with a rate of change limit. The controller continuously determines the rate of change of motor speed during operation. An obstruction is detected whenever this rate of change of speed indicates a rate of increase in torque greater than a predetermined amount.

The travel counter may also be employed for detection of the fully opened and fully closed limits. A close travel memory stores a close travel count corresponding to the fully closed position. An open travel memory stores an open travel count corresponding to the fully opened position. The controller stops the motor when the travel reaches or passes the close travel count while closing the door, and stops the motor when the travel count reaches or passes the open travel count while opening the door.

In accordance with the preferred embodiment of this invention, both the close travel count and the open travel count are operator settable. This is accomplished in a first embodiment via a close travel limit momentary contact push button switch and a open travel limit momentary contact push button switch. The controller changes the open and close limits dependant upon the button pushed and the state of operation of the automatic door operator. The close travel count is advanced toward more fully closed if the close limit button is activated when the motor is closing the door or when the motor is stopped and last operated to close the door. The close travel count is advanced toward less fully closed upon operation of the close limit button if the motor is opening the door or if the motor is stopped and last moved to open the door. Likewise, the open limit is advanced toward more fully opened if the motor is opening the door or last moved to open the door, and is advanced toward less fully opened if the motor is closing the door or last moved to close the door upon operation of the open limit button.

In an alternative embodiment, the open and close limit buttons are interpreted differently. Momentary activation of the open limit button alone advances the open travel count toward a more open position regardless of the state of the controller. Likewise, momentary activation of the close limit button alone advances the close travel count toward a more closed position. Simultaneous activation of both these buttons, causes both the open and close travel counts to be reset to predetermined values.

In yet a further alternative embodiment, differing switches are employed. Each of the open limit switch and the close limit switch is a single pole, double throw momentary contact switch with a center off position. Momentary activation of the up position of the open limit switch advances the open travel count toward more fully open. Momentary activation of the down position of the open limit switch advances the open travel count toward less fully closed. Likewise, activation of the up position of the close limit switch advances the close travel count toward less fully closed and activation of the down position of the close limit switch advances the close travel count toward more fully closed.

In the preferred embodiment, the travel counter, the close travel memory and the open travel memory all have the same count range. This count range is selected to be greater than the expected maximum count of rotation pulses for movement between the open and close limit positions. These counts are initialized upon initial application of electrical power to the automatic door operator. The travel counter is initialized to a number near the middle of this count range. The close travel count is initialized to a number greater than the travel counter. The open travel count is initialized to a number no greater than the travel counter. The operational values of the open and close limits are then set upon installation of the automatic door operator.

In the preferred embodiment the controller of the automatic door operator can be used to control either a four-pole motor or a six-pole motor. A manual motor type selection switch indicates which motor type is installed. A torque limit table memory has predetermined torque limits each of the predetermined closing torque limits for a four-pole motor, each of the opening torque limits for a four-pole motor, each of the closing torque limits for a six-pole motor, and each of the opening torque limits for a six-pole motor. The controller recalls the appropriate torque limit from this torque limit table memory corresponding to whether the door is opening or closing, the selected opening or closing torque limit, and the selected motor type. The motor type selection switch is constructed to default to selection of a four-pole motor, which develops less torque at all speeds than a six-pole motor.

BRIEF DESCRIPTION OF THE DRAWINGS

These and other objects and aspects of the present invention will become clear from the following description of the invention including the Figures, in which:

FIG. 1 illustrates in block diagram form the automatic door operator in accordance with the present invention;

FIG. 7 illustrates in flow chart form a program for control of the central processing unit illustrated in FIG. 1;

FIG. 8 illustrates in flow chart form the command input subroutine illustrated in FIG. 1;

FIG. 9 illustrates in flow chart form a first embodiment of the open limit subroutine illustrated in FIG. 7;

FIG. 10 illustrates in flow chart form a first embodiment of the close limit subroutine illustrated in FIG. 7;

FIG. 11 illustrates in flow chart form an alternative embodiment of the open limit subroutine illustrated in FIG. 7;

FIG. 19 illustrates in schematic diagram form an alternative manner of powering the pulse counting circuit and the travel limits circuit illustrated in FIG. 1.

DETAILED DESCRIPTION OF THE PREFERRED EMBODIMENTS

Figure 2A:
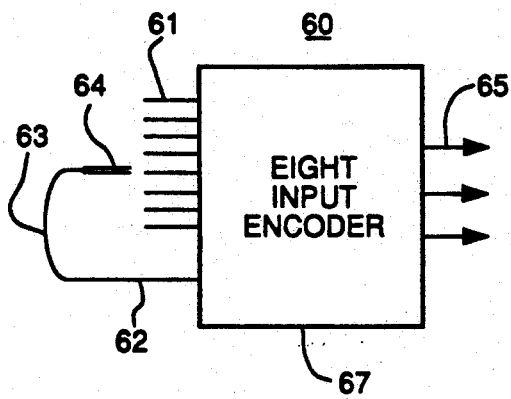
FIGS. 2A and 2B illustrate in greater detail the preferred embodiment of the closing torque limit and the opening torque limit input devices.

The present invention is an automatic door operator, such as employed for operation of residential garage doors, which includes electronic detection of door travel. The present invention is particularly directed to use of electronic detection of door travel for electronic obstruction detection and for electronically setting open and close limits. More particularly, the present invention is directed toward the manner in which the obstruction detection limits and the open and close travel limits are entered into the automatic door operator. FIG. 1 illustrates in block diagram form the general structure of the automatic door operator. FIGS. 2-6, 13 and 19 illustrate in greater detail, some of the parts of the automatic door operator. FIGS. 7-12 and 14-18 illustrate in flow chart form various portions of the program for control of the automatic door operator.

FIG. 1 illustrates in block diagram form the general construction of the automatic door operator of the present invention. Most of the operation and control functions of the automatic door operator of this invention are performed by special purpose processor circuit 100. Special purpose processor circuit 100 is an application specific processor circuit (ASPC). Special purpose processor circuit 100 is in general a microprocessor circuit including some special purpose peripheral devices particularly designed for this application. Special purpose processor circuit 100 is preferably embodied in a single integrated circuit.

Special purpose processor circuit 100 is the heart of the automatic door operator of the present invention. Special purpose processor circuit 100 includes central processing unit 110 which is capable of performing arithmetic and logic operations in a programmed sequence. Clock 115 is preferably a circuit capable of generating signals corresponding to the passage of real time. Several processes of the automatic door operator of the present invention are controlled by measured increments of time. Central processing unit 110 preferably performs these processes by reference to the output of clock 115 at a beginning time and at later times until a particular time interval has elapsed.

Central processing unit 110 is bi-directionally coupled to a memory. This memory includes read only memory 121, random access memory 123 and electrically alterable programmable read only memory (EAPROM) 125. Read only memory 121 includes data permanently fixed during the manufacture of special purpose processor circuit 100. Read only memory 121 preferably includes a program for control of central processing unit 110 permitting central processing unit 110 to control various functions of the automatic door operator. This program will be further detailed below in conjunction with FIGS. 7-12 and 14-18. Read only memory 121 also includes various data constants employed in the operation of the central processing unit 110. Random access memory 123 serves as read/write memory employed by central processing unit 110 for temporary storage of data, the intermediate results of computations, and the like. The data stored within random access memory 123 is easily alterable by central processing unit 110. Electrically alterable programmable read only memory 125 is a semi-permanent memory. Electrically alterable programmable read only memory 125 can be easily read by central processing unit 110 in the same manner as reading read only memory 121 and random access memory 123. Central processing unit 110 may also alter the data stored within electrically alterable read only memory 125 in a special write cycle. It is known in the art that such electrically alterable programmable read only memory has a limited number of such write cycles during its operational life. For this reason electrically alterable programmable read only memory 125 is preferably employed to store data which does not change often, such as the open and close travel limits, the adaptive torque limits for respective regions of opening and closing travel, or the like in a manner which will be further detailed below.

The automatic door operator of the present invention includes a conventional radio frequency command link. Radio frequency transmitter 10 including antenna 15 produces a coded radio frequency signal when activated. In accordance with the prior art, radio frequency transmitter 10 preferably includes a momentary contact pushbutton switch which is manually operated. This radio frequency signal is received on antenna 21 of radio frequency receiver 20. Radio frequency receiver 20 preferably includes some manner for determining whether or not any received radio frequency signal is encoded for the particular automatic door operator. In accordance with the prior art, the radio frequency transmitter 10 and the radio frequency receiver 20 are set to operate on the same code, in order to lessen interference between similar automatic door operators employed in the same vicinity. Radio frequency receiver 20 generates an input signal to input circuit 131 only if it receives a properly encoded radio frequency signal. Input circuit 131 is coupled to input/output bus 140 which is further coupled to central processing unit 110. Thus receipt of properly encoded radio frequency signal is communicated to central processing unit 110 which can then take appropriate action in accordance with the then current state of the automatic door operator.

A momentary contact pushbutton switch 25 is coupled to input circuit 131 in parallel to radio frequency receiver 20. Resistor 23 is coupled to the positive voltage supply in order to assure a logical "high" input to input circuit 131 when neither radio frequency receiver 20 nor switch 25 is activated. In accordance with the prior art, momentary contact pushbutton switch 25 is mounted within the garage at a location near to the door to the adjoining interior space. The automatic door operator of the present invention operates in the same fashion whether an input command is received via radio frequency transmitter 10 or via pushbutton switch 25.

There are several additional switches for input to special purpose processor circuit 100. These include open limit switch 30, close limit switch 40 and motor type selection switch 50. Open limit switch 30 and close limit switch 40 are each momentary contact pushbutton switches. Activation of one of these switches supplies a logical "high" input to respective input circuits 132 and 133. Resistors 33 and 43, are coupled to ground to insure that a logical "low" signal is applied to the respective input circuit 132 or 132 if the corresponding pushbutton switch is not activated. Operation of open limit switch 30 permits alteration of the electrically stored open travel limit for the automatic door operator. Similarly, activation of close limit switch 40 permits alteration of the close travel limit stored in the automatic door operator. The manner of alteration of these limits will be further detailed below. Motor type selection switch 50 is preferably a rocker switch or toggle switch which retains either an opened or closed position. By activation of motor type selection switch 50, the operator indicates whether the automatic door operator is coupled to a four-pole motor or to a six-pole motor. When motor type selection switch 50 is open, resistor 53 ensures that a logical "low" is supplied to input circuit 134. This corresponds to selection of a four-pole motor. When motor pole selection switch 50 is closed a logical "high" is supplied to input circuit 134. This corresponds to selection of a six-pole motor. The manner in which the automatic door operator employs these signals will be further disclosed below.

Closing torque limits input circuit 60 permits operator selection of a closing torque limit. In accordance with the preferred embodiment of the present invention, this selection is made from a set of predetermined closing torque limits. In this example the operator may select one of eight predetermined torque limits for the closing operation of the door. The selection made by the operator is communicated via plural lines 65 to input circuit 135. The manner of operation of the automatic door operator based on the selected closing torque limit will be further disclosed below.

Opening torque limits input circuit 70 similarly permits the operator to select a torque limit for the opening operation of the door. This is also preferably selected from a predetermined set of opening torque limits. In accordance with this example opening torque limits input circuit 70 permits the operator to select one of four predetermined torque limits for use during the opening operation of the door. Plural lines 75 supply the selection to input circuit 136.

Figure 2B:
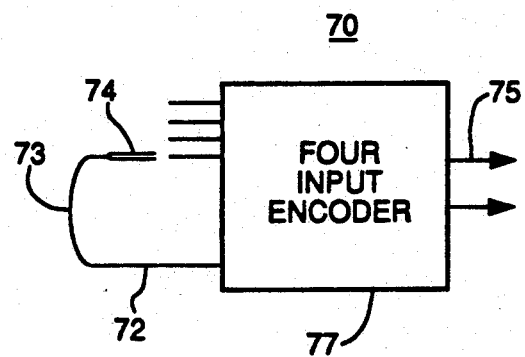

FIGS. 2A, 2B, 3A, 3B and 4 illustrate alternative embodiments for closing torque limits input circuit 60 and opening torque limits input circuit 70. FIGS. 2A and 2B illustrate a first, preferred embodiment for closing torque limits input circuit 60 and opening torque limits input circuit 70. In accordance with the preferred embodiment, closing torque limits input circuit 60 includes an eight input encoder circuit 67. Eight input pins 61 are connected to eight input encoder circuit 67. A ninth pin 62 is coupled by a flexible wire 63 to a movable socket 64. The operator (or user) selects the appropriate closing torque limit by placing socket 64 over the corresponding input pin 61. Eight input encoder 67 provides a predetermined signal at pin 62 which is thus coupled to only one of the plural pins 61. Eight input encoder 67 then develops an encoded signal on lines 65 corresponding to this particular input pin 61. Opening torque limits input circuit 70 operates in a similar fashion. Four input encoder circuit 77 has four input pins 71. An output pin 72 is attached via flexible wire 73 to a socket 74. The operator selects one of the four closing torque limits by placing socket 74 over a corresponding one of pins 71. Four input encoder circuit 77 electrically detects this connection and generates the appropriate coded signal on lines 75.

Figure 3A:
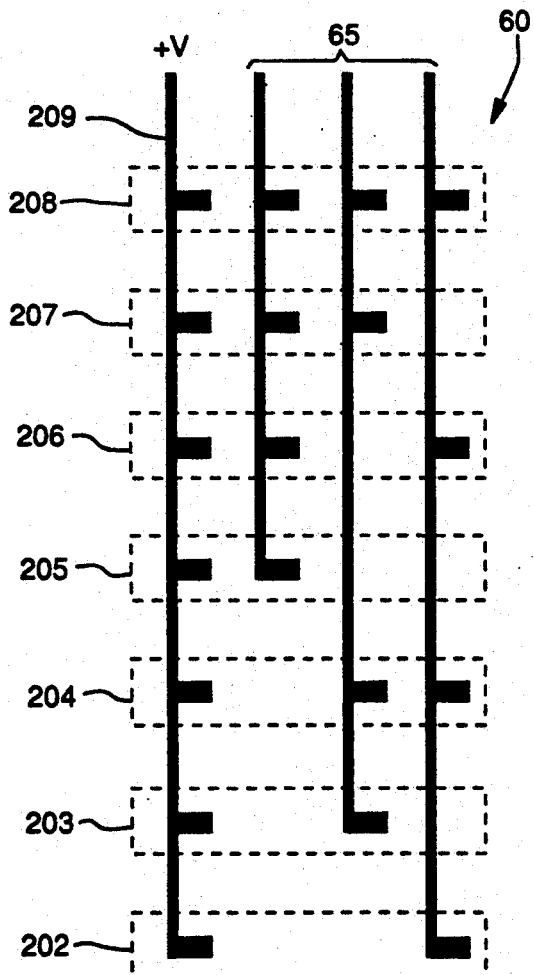
FIGS. 3A and 3B illustrate respective switches for the closing torque limit and opening torque limit input devices in accordance with an alternative embodiment.
Figure 3B:
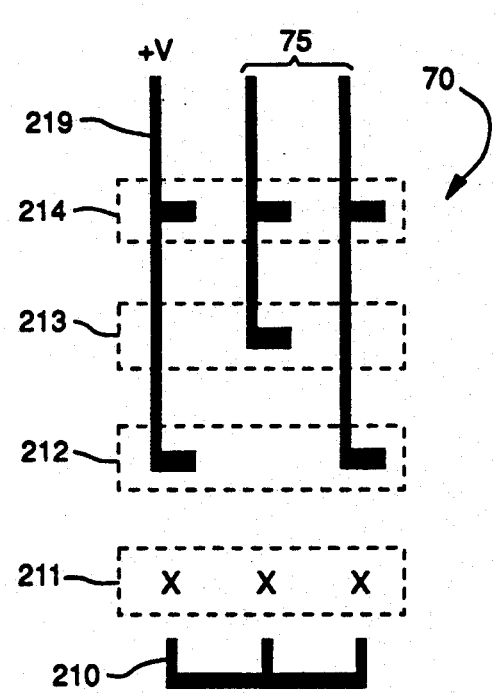

FIG. 3A and 3B illustrate a first alternative embodiment of closing torque limits input circuit 60 and opening torque limits input circuit 70. In accordance with this alternative embodiment, closing torque limits input circuit 60 and opening torque limits input circuit 70 are embodied by multi-position slide switches. As illustrated in FIGS. 3A and 3B, closing torque limits input circuit 60 comprises an eight-position slide switch having positions 201 through 208. A slider 200 has four prongs which may couple voltage line 209 to one or more of the signal lines 65 depending upon the position of slider 200. The slider 200 and the lines have been constructed so that positioning it at one of the eight positions 201 to 208 produces the properly encoded signal on lines 65. In a similar fashion, opening torque limits input circuit 70 includes a slider 210 which can be positioned at positions 211 to 214. Depending upon the position of slider 210, voltage line 219 may be coupled to one or more of the output lines 75. Slider 210 and the lines for each of the switch positions 211 to 214 have been constructed so that positioning of slider 210 at one of the locations 211 to 214 produces the appropriate coded output on lines 75.

Figure 4:
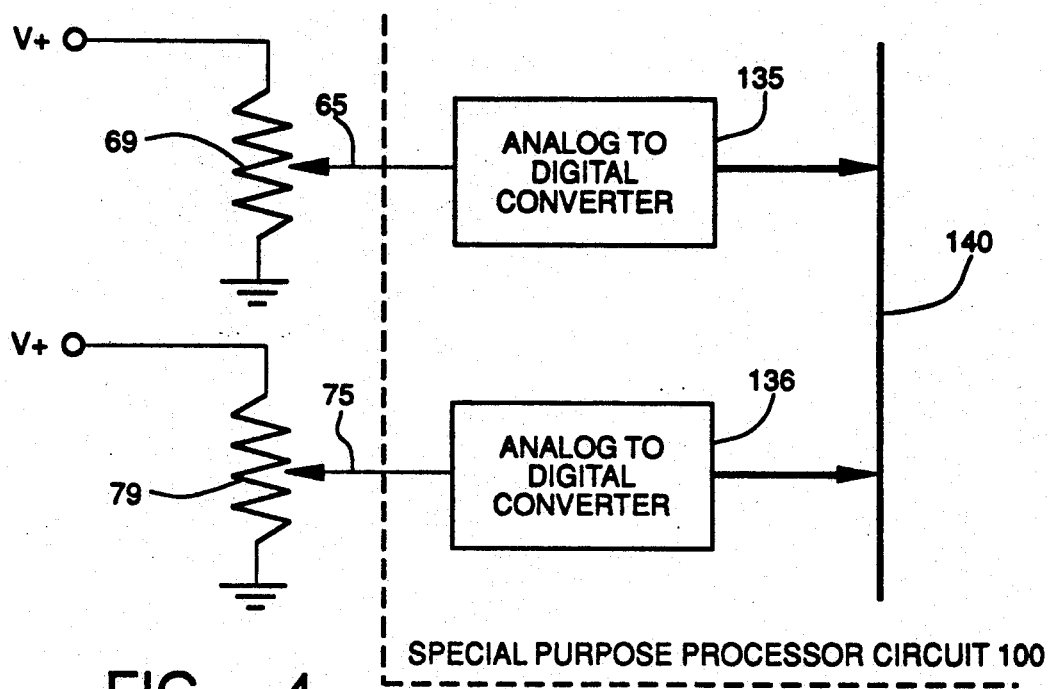
FIG. 4 illustrates potentiometers for the closing torque limit and opening torque limit input devices in accordance with a yet further alternative embodiment.

FIG. 4 illustrates a further alternative embodiment for closing torque limits input device 60 and opening torque limits input device 70, together with the altered portion of special purpose processor circuit needed to operate with this alternative embodiment. Closing torque limits input device 60 is embodied by potentiometer 69. Potentiometer 69 has one fixed terminal coupled to the positive voltage supply and the other fixed terminal grounded. The adjustable terminal is connected via line 65 to special purpose processor circuit 100. FIG. 4 illustrates that input circuit 135 is embodied as an analog to digital converter. Analog to digital converter 135 receives the voltage produced by potentiometer 69, converts this voltage into a digital number and supplies this number to central processing unit 110 via input/output bus 140. Thus the torque limit is selected by operator adjustment of potentiometer 69. A similar potentiometer 79, coupled to analog to digital converter 136, embodies opening torque limits input device 70. Although two analog to digital converters are shown, it is known in the art to sample multiple inputs with a single analog to digital converter. In view of the fact that the torque limits are not expected to change rapidly, a single analog to digital converter can serve for the two inputs.

These alternatives have differing advantages. The alternative illustrated in FIGS. 2A and 2B for the torque limits input circuits provides an inexpensive and easy to manufacture switch. Because it is contemplated that the torque limits will be very infrequently changed, it is not necessary to provide a switch mechanism which can withstand repeated changes. On the other hand, additional electronics in the eight input encoder 67 and the four input encoder 77 are required for this technique. These encoders are required because it is greatly advantageous to reduce the total number of input and output pins required for special purpose processor circuit 100.

The alternative embodiment of FIGS. 3A and 3B include a switch mechanism which is more expensive and more difficult to manufacture. However, the cost of manufacture is not very great because the switch can be mounted directly on the printed circuit board employed in the construction of the automatic door operator with the lines being printed circuit lands. The advantage of the alternative technique illustrated in FIGS. 3A and 3B are that no encoder electronics is required, because the switch itself generates the encoded signal.

The alternative embodiment of FIG. 4 includes an inexpensive, readily available input device. This alternative requires the fewest input pins to special purpose processor circuit 110 at the expense of requiring analog to digital conversion. Depending upon the range of the analog to digital converter, this embodiment permits the user to select from a larger set of torque limits than possible with the other embodiments.

Referring back to FIG. 1, output circuit 151, which is connected to input/output bus 140, provides either an On signal or an Off signal to lamp driver circuit 80. Lamp driver circuit 80 is in turn connected to electric lamp 85. It is known in the art to provide an electric lamp mounted on the drive housing of a residential garage door. This lamp is turned on whenever the automatic door operator is activated and remains on for a predetermined time after the door has stopped moving. This is useful for night time use of a garage door where the delay following the last movement of the door enables the lamp to remain on until the user can enter the rest of the house. Output circuit 151 provides a logic signal output to lamp driver circuit 80. Lamp driver circuit 80 converts this logic signal into control of a switching device for operating lamp 85. There are a number of switching techniques known in the art, such as electromechanical relays, bipolar power transistors, field effect transistors and silicon controlled rectifiers, which can be employed in lamp driver circuit 80.

In a similar fashion output circuit 153 is coupled to input/output bus 140 and drives motor control circuit 90. Central processing unit 110 provides the appropriate signals on input/output bus 140 to control output circuit 153 to generate a clockwise motor command CW, a counterclockwise motor command CCW and a brake command Brake. Motor control circuit 90 is a conventional motor control circuit capable of rotating motor 91 in the clockwise direction for closing the door, in the counterclockwise direction for opening the door or for dynamically braking this motor. Numerous motor control circuits of the type required are known in the art. Since this feature forms no part of the present invention it will not be further described. Motor 91 is coupled to the door in a conventional fashion for opening and closing this door. The major function of the automatic door operator illustrated in FIG. 1 is control of this motor 91 for control of the opening and closing operation of the door.

In accordance with the present invention one portion of the shaft of the motor 91 is coupled to multipole magnet 93. This enables multipole magnet 93 to rotate with the rotation of the shaft of motor 91. One or more Hall effect sensors 95 are disposed in proximity to multipole magnet 93 in order to magnetically detect the rotation of multipole magnet 93. The output from the Hall effect sensors 95 is connected to pulse counting circuit 161 within special purpose processing 100. Pulse counting circuit 161 preferably averages a number of pulses from Hall effect sensors 95 to provide a more stable indication of speed. It is known that the multiple poles on multipole magnet 93 may not be evenly spaced and that the poles may have differing flux densities. Thus speed detection based upon individual pulses would be noisy. Pulse counting circuit 161 also provides an indication of the direction of rotation of motor 91.

Figure 5:
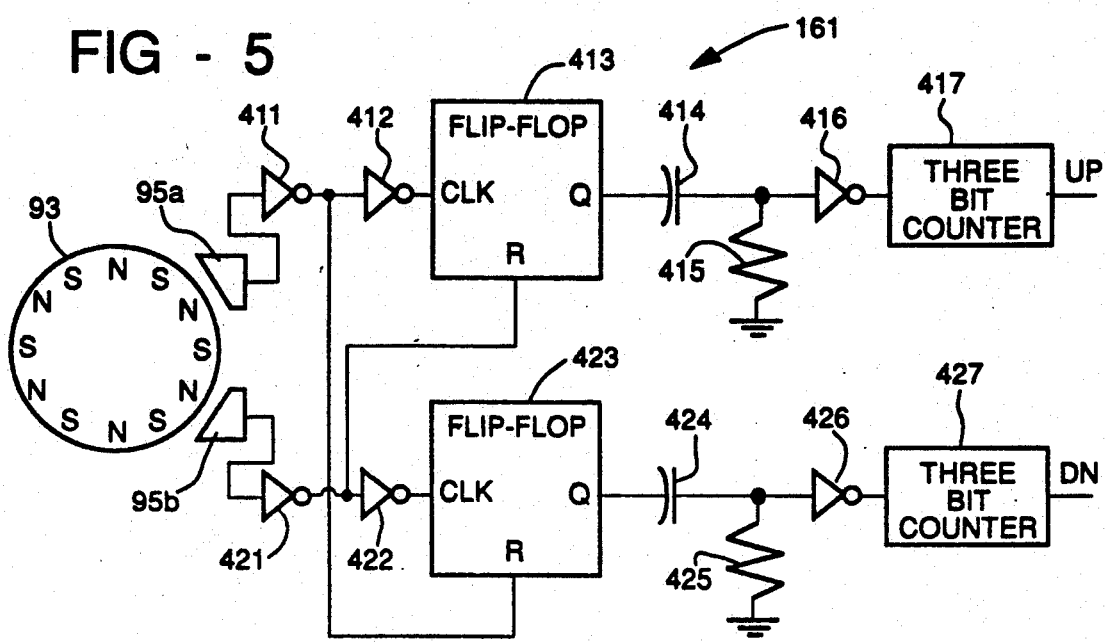
FIG. 5 illustrates in greater detail the pulse counting circuit illustrated in FIG. 1.

Pulse counting circuit 161 is better illustrated in FIG. 5. FIG. 5 shows multipole magnet 93 having 12 poles. Those skilled in the art would recognize that multipole magnet 93 may include any convenient number of poles. However, in accordance with the preferred embodiment of the present invention multipole magnet 93 has either 12 poles or 10 poles, depending on whether the automatic door operator operates on 50 Hz power or 60 Hz electric power. The reason for this selection will be fully described below. FIG. 5 further illustrates Hall effect sensors 95a and 95b. Each of these Hall effect sensors 95a and 95b generates a pulse output when a pole of multipole magnet 93 passes its location. Because Hall effect sensors 95a and 95b are located at slightly different locations on the perimeter of multipole magnet 93, the relative phase of the signals from these two Hall effect sensors gives an indication of the direction of rotation of multipole magnet 93. This in turn gives an indication of whether the door is opening or closing.

Pulse counting circuit 161 operates as follows. Hall effect sensor 95a is coupled to invertor 411 serving as a buffer amplifier. In a similar fashion, Hall effect sensor 95b is coupled to an invertor 421. The output of invertor 411 is coupled to the clock input of flip-flop 413 via invertor 412. The output of invertor 411 is also connected to the reset input of flip-flop 423. In a similar fashion, the output of invertor 421 is connected to the clock input of flip-flop circuit 423 via invertor 422 and is directly coupled to the reset input of flip-flop 413. The Q output of flip-flop 413 has a pulse duration which depends upon the relative phase of the signals received by Hall effect sensors 95a and 95b. Likewise, the Q output of flip-flop 423 has a pulse duration dependent upon the phase of the signals from Hall effect sensors 95a and 95b in the opposite sense. The Q output of flip-flop 413 is supplied to a high pass filter circuit including capacitor 414 and resistor 415. The output of this high pass filter is supplied to invertor 416. In a similar fashion, a high pass filter including capacitor 424 and resistor 425 is coupled to the Q output of flip-flop circuit 423. This high pass filter supplies the input of invertor 426. In use, one or the other of invertors 416 and 426 generates output pulses depending upon the direction of rotation of multipole magnet 93. Thus, pulse counting circuit 161 provides an indication of the direction of rotation of multipole magnet 93.

Pulse counting circuit 161 further includes three bit counter 417 and three bit counter 427. Three bit counter 417 generates a pulse on the Up output each time eight pulses are received from invertor 416. Likewise, three bit counter 427 generates a pulse on the Down output each time eight pulses are received from invertor 426. As noted above, this counting is intended to smooth out variations in the angular dimensions between poles of multipole magnet 93. In addition, the flux density produced by the various poles may be slightly different causing slightly different pulse shapes from Hall effect sensors 95a and 95b. Three bit counters 417 and 428 compensate for these variations in pulse output from the Hall effect sensors. Three bit counters 417 and 427 integrate these variations over a number of pulses in order to smooth their effect. A three bit counter was selected in order to count eight input pulses for each Up or Down output pulse in consideration with the known motor rotation rates, the selected number of poles and the speed of operation of the particular microprocessor circuit selected in the preferred embodiment. In addition, counting by eight employs a whole number of bits and thus provides the maximum count for a particular amount of circuitry. Other larger or smaller counts can be employed depending upon the relationship between these parameters.

Though the preferred embodiment of the present invention employs a multipole magnet and Hall effect sensors, this is not required. It is known in the art to employ a rotating slotted disk and a pair of optical detectors. Such a system would produce rotation pulses in the same manner as the magnetic system described above.

Referring back to FIG. 1, travel limits circuit 163 is coupled to input/output bus 140 and also receives signals from pulse counting circuit 161. Travel limits circuit 163 keeps track of the door position and provides an open limit signal when the door is fully opened and a close limit signal when the door is fully closed.

Figure 6:
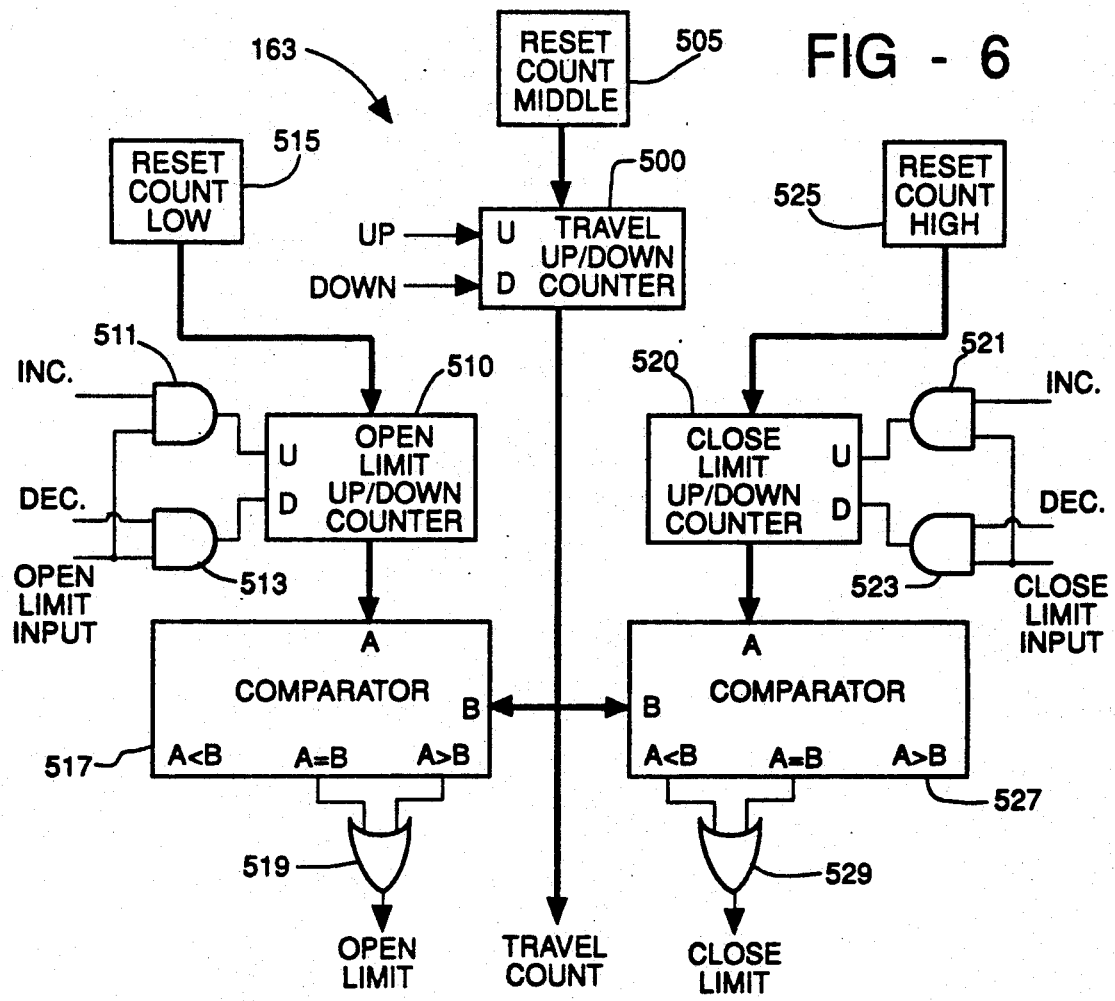
FIG. 6 illustrates in greater detail the travel limit circuit illustrated in FIG. 1.

Details of the preferred embodiment of travel limits circuit 163 are illustrated in FIG. 6. A travel up/down counter 500 receives the respective Up and Down outputs from pulse counting circuit 161 illustrated in FIG. 5. Clockwise rotation of motor 91 causes generation of Up pulses by pulse counting circuit 161. The application of these Up pulses to travel up/down counter 500 causes the count stored therein to be incremented on each received pulse. Similarly, operating of the door by counterclockwise rotation of motor 91 causes generation of Down pulses by pulse counting circuit 161. The count stored within travel up/down counter 500 is decremented once each receipt of a Down pulse from pulse counting circuit 161. Thus the count store within travel up/down counter 500 represents the door position.

The count stored within travel up/down counter 500 is initialized to the value provided by reset count circuit 505 upon initial application of electric power to the apparatus. In accordance with the preferred embodiment of the present invention travel up/down counter 500 counts between 0 and approximately 5000. This count range is selected to be substantially greater than the expected maximum number of rotation pulses generated in travel from fully open to fully closed. In the preferred embodiment reset count circuit 505 provides an initial count of 2500, or about half of the full count of travel up/down counter 500.

Travel limit circuit 163 also includes an open limit up/down counter 510. Open limit up/down counter 510 stores a count corresponding to the fully opened position of the door. And gates 511 and 513 supply either an up or a down signal to open limit up/down counter 510 for altering this count. If the open limit input is received and an increment input is received from central processing unit 110 via input/output bus 140, then And gate 511 permits the count within open limit up/down counter 510 to be increased. Similarly, if a decrement signal is received from central processing unit 110 via input/output bus 140 simultaneously with a receipt of an open limit input, then And gate 513 provides a down input to open limit up/down counter 510 causing the count to be decreased.

Reset count circuit 515 is coupled to open limit up/down counter 510 for providing an initial count upon initial application of electrical power. In accordance with the preferred embodiment of the present invention open limit up/down counter 510 has the same count range as travel up/down counter 500, that is from 0 to 5000. Reset count circuit 515 has a reset count of 2500, or approximately one half of the full count of open limit up/down counter 510. This reset count is selected to be no greater than the reset count of travel up/down counter 500.

Travel limit circuit 163 further includes a close limit up/down counter 520 connected in a similar fashion as open limit up/down counter 510. Close limit up/down counter 520 includes a count range the same as the count range of travel up/down counter 500, or approximately from 0 to 5000. The count within close limit up/down counter 520 may be increased via And gate 521 upon simultaneous occurrence of an increment signal and a close limit signal. In addition, the count within close limit up/down counter 520 may be decreased via And gate 523 upon simultaneous receipt of a decrement signal and the close limit input. Reset count circuit 525 provides a predetermined count to close limit up/down counter 510 upon initial application of electrical power. In accordance with the preferred embodiment of the present invention this reset count is greater than the reset count of travel up/down counter 500. In the preferred embodiment this reset count is 3000.

A pair of digital comparators 517 and 527 provide the detection of the travel limits of the door. The count of the travel up/down counter 500 is supplied to the B input of each comparator 517 and 527. The count of the open limit up/down counter 510 is supplied to the A input of comparator 517. Or gate 519 generates the open limit signal if the count of open limit up/down counter 510 is equal to or greater than the count of travel up/down counter 500. In a like fashion, the count of the close limit up/down counter 520 is supplied to the A input or comparator 527. Or gate 529 generates the close limit signal if the count of close limit up/down counter 520 is less than or equal to the count of travel up/down counter 500. The open limit signal and the close limit signal are supplied to central processing unit 110 via input/output bus 140. Upon receipt of either of these signals, central processing unit 110 takes appropriate action in a manner that will be described below.

FIG. 1 illustrates travel limits circuit 163 as separate from electrically alterable programmable read only memory 125. In accordance with the preferred embodiment of the present invention, the counts of at least some of the counters 500, 510 and 520 are stored in electrically alterable read only memory 125. This can be achieved by having the counts stored directly in electrically alterable read only memory 125 or by having these counts stored in "shadow" registers which are periodically compared to particular memory locations within electrically alterable read only memory 125. Because electrically alterable read only memory 125 has a limited number of write cycles, it is preferable that data not be written into this memory unless it has changed. This technique enables the location of the door and the open and close limits to be preserved even if electric power to special purpose processor circuit 100 is lost. If this technique is used, special provision is needed to coordinate the reset counts of reset count circuits 505, 515 and 525 in order to avoid resetting a valid count. For example, it is possible to write a single bit in electrically alterable programmable read only memory 125 upon first setting of the open and close travel limits and disable the resetting operation if this bit is set.

The operation of the automatic door operator will now be described in conjunction with a description of the program for operation of central processing unit 110. FIGS. 7–12 and 14–18 are flow charts illustrating an example of a program, with alternatives, preferably stored within read only memory 121 for control of the operation of central processing unit 110. Central processing unit 110 in turn receives inputs from various inputs devices and controls the output signal supplied to lamp driver 80 which controls lamp 85 and the signals supplied to motor control circuit 90 which controls the operation of the motor 91, thereby controlling the motion of the door. The flow charts illustrated in FIGS. 7–12 and 14–18 are not intended to illustrate the complete detailed and exact steps necessary to control the operation of central processing unit 110. Rather, FIGS. 7–12 and 14–18 are intended to provide a general overview of the steps necessary for this control. In particular, numerous conventional input and output functions are not described in detail. It is believed however, that one skilled in the art of microprocessor programming would be able to produce the exact detailed instructions required for control of a particular central processing unit from the description of FIGS. 7–12 and 14–18, once the particular central processing unit has been selected together with its corresponding instruction set.

FIG. 7 illustrates program 600 for control of special purpose processor circuit 100. Program 600 is preferably stored within read only memory 121 and is thus immediately available for operation of central processing unit 110 once electric power has been supplied to the automatic door operator. Program 600 is a top level program and various other aspects the operation of the automatic garage door operator are executed as subroutines to this top level program.

Program 600 is begun by a start block 601. Start block 601 preferably is stored at a default location within read only memory 121 which is first executed upon initial application of electric power to special purpose processor circuit 100. It is known in the art to include various start up functions within this block such as a self test of the operation of central processing unit 110. These features are conventional and will not be further described.

After initiation program 600 tests to determine whether or not a command signal has been received (decision block 602). Such a command signal may be received by transmission of a radio frequency signal from radio frequency transmitter 15 to radio frequency receiver 20 where it is recognized as including the appropriate encoding. In the alterative the command signal may be received by momentary activation of pushbutton switch 25. In either case, input circuit 131 provides a signal on input/output bus 140 which is detected by central processing unit 110. If such a command signal has been received, then program 600 executes command input subroutine 603. Command input subroutine 603 will be further described below in conjunction with FIG. 8.

If a command input signal has not been received, program 600 tests to determine whether or not the open limit signal has been received (decision block 604). Momentary depression of open limit switch 30 causes input circuit 132 to produce a signal on input/output bus 140 which is detected by central processing unit 110. If such an open limit signal has been received then program 600 performs an open limit subroutine (processing block 605). Various alternatives of this open limit subroutine will be further described below in conjunction with FIGS. 9, 11 and 14.

If neither a command input signal nor an open limit signal has been received, program 600 tests to determine whether the close limit signal has been received (decision block 606). Such a close limit signal is received by central processing unit 110 via input/output bus 140 and input circuit 133 upon depression of momentary contact pushbutton close limit switch 40. If such a close limit signal has been received program 600 executes close limit subroutine 607. Various alternative of this close limit subroutine 607 will be further described below in conjunction with FIGS. 10, 12 and 15.

If neither of these aforementioned input signals has been received, program 600 tests to determine whether or not motor 91 is currently operating (decision block 608). This detection is whether central processing unit 110 is currently commanding output circuit 153 to produce either the clockwise motor command CW or the counterclockwise motor command CCW for application to motor control circuit 90. If central processing unit 110 is currently commanding output circuit 153 to produce either of these signals, program 600 executes motor operation subroutine 609. Motor operation subroutine 609 is further described below in conjunction with FIGS. 16A and 16B.

If none of these prior tests have been satisfied, program 600 tests to determine whether or not the lamp time has expired (decision block 610). In a manner which will be more fully disclosed below, the automatic door operator of the present invention illuminates lamp 85 upon any motion of the door throughout the movement of the door and for a predetermined interval of time thereafter. Central processing unit 110 determines whether or not this predetermined lamp time interval has expired by reference to signals received from clock 115. If this time has expired, then the lamp is turned off (processing block 611). It is known in the art to provide a selection of the length of this lamp time interval. For example, the position of a switch coupled to special purpose processor circuit 100 can determine whether this lamp time interval is four and one half minutes or ten minutes.

If no lamp time off is required at this time then program 600 returns to decision 602 to repeat the determination of whether a command input signal has been received. Program 600 remains within this loop repeating the tests until one of the tests is satisfied. At that time the particular subroutine indicated is executed and then the loop of tests repeats.

Command input subroutine 603 is illustrated in FIG. 8. Command input subroutine 603 is begun via start block 701. Command input subroutine 603 first tests to determine whether or not motor 91 is operating (decision block 702). This tests to determine whether or not central processing unit 110 is currently commanding input circuit 153 to produce either the clockwise motor command CW or the counterclockwise motor command CCW. If the motor is currently operating, then receipt of the command input signal causes the motor to be stopped (processing block 703). Central processing unit 110 accomplishes this task by signalling output circuit 153 to no longer produce either the clockwise motor command CW or the counterclockwise motor command CCW but rather to produce the Brake command instead. Motor control circuit 90 responses to receipt of the Brake command by dynamically braking motor 91, thereby stopping the motor and stopping motion of the door.

If the motor is not operating, that is that output circuit 153 is not producing either the clockwise motor command CW or the counterclockwise motor command CCW, then command input subroutine 603 tests to determine whether or not the last motor operation was in the counterclockwise direction (decision block 704). In accordance with the prior art, receipt of the command signal while the motor is not operating causes the motor to operate in a direction opposite to the last direction of operation. Thus if the last motor operation was in the clockwise direction then the motor is now operated in the counterclockwise direction (processing block 705). If the last operation was not in the clockwise direction, then the motor is now operated in the clockwise direction (processing 706). This operation is achieved by central processing unit 110 signalling output circuit 153 via input/output bus 140 to produce the appropriate motor command CW or CCW. This motor drive signal is then coupled to motor control circuit 90 for operation of the motor. In either case, the motor timer is started (processing block 707). In accordance with the preferred embodiment, there is a predetermined maximum operation interval for motor 91. This is set to be longer than the longest expected operation period. In the case of residential garage door operators an Underwriters Laboratory standard requires this maximum operational interval to be less than thirty seconds. This motor operation interval is begun by central processing unit 110 reading the current time indicated by clock 115 and storing this time in random access memory 123. Then the lamp is turned on (processing block 708). This is achieved by central processing unit 110 signalling output circuit 151 via input/output bus 140 to generate an On signal for application to lamp driver circuit 80. Lamp driver circuit 80 then supplies electric power to lamp 85 to illuminate this lamp.

Regardless of the outcome of the command signal, command input subroutine 603 sequences the four-phase logic flags (processing block 709). As mentioned above, the automatic door operator preferably operates in a sequence including: moving the door up; stop; moving the door down; and stop. The state within this four-phase sequence is memorized via the four-phase logic flags. These four-phase logic flags enable central processing unit 110 to determine the last direction of motor operation in decision block 704. Next command input subroutine 603 resets and starts the lamp timer (processing 710). The lamp timer is set in the same manner as the motor operation interval timer, by reading the current time indicated by clock 115 and storing this time in random access memory 123. As noted above, it is known in that art to permit this lamp time interval to be selectable between four and one half and ten minutes. Once this is done then command input subroutine 603 is complete. Command input subroutine 603 then returns to main program 600 via return block 711.

A first embodiment of open limit subroutine 605 is illustrated in FIG. 9. Open limit subroutine 605 is entered when decision block 604 determines that the open limit signal has been received. Open limit subroutine 605 is begun via start block 801. Open limit subroutine 605 then determines whether or not the motor is operating (decision block 802). This determination is made based upon whether or not central processing unit 110 is currently commanding output circuit 153 to produce either the clockwise motor command CW or the counterclockwise motor command CCW. If the motor is currently operating, either opening or closing, then open limit subroutine 605 tests to determine whether or not the motor is moving in the clockwise direction (decision block 803). This test is made in conjunction with the Up or Down output produced by pulse counting circuit 161. Production of Down pulses by pulse counting circuit 161 indicates that the motor 91 is operating in the clockwise direction to close the door. Generation of Up pulses by pulse counting circuit 161 indicates that motor 91 is operating in the counterclockwise direction to open the door.

If the motor is not operating clockwise, that is the motor is now operating counterclockwise, then open limit subroutine 605 causes the motor to be stopped (processing block 804). As noted before in conjunction with processing block 703, this process takes place via central processing unit 110 signalling output circuit 153 via input/output bus 140 to generate the Brake command for application to motor control circuit 90. Motor control circuit 90 then dynamically brakes motor 91. Open limit subroutine 605 then decrements the open limit count (processing block 805). Referring back to FIG. 6, this process takes place by central processing unit 110 producing the decrement signal for application to travel limits circuit 163. This decrement signal is applied to And gate 513. The simultaneous receipt of the decrement signal and the open limit input signal at And gate 513 produces a signal at the down count input of open limit up/down counter 510. This causes the count stored within open limit up/down counter 510 to be decremented. In accordance with this embodiment of the present invention this causes the open limit stored within open limit up/down counter 510 to correspond to a more fully opened position.

Open limit subroutine 605 then operates the motor in the counterclockwise direction (processing block 806). This is achieved by causing central processing unit 110 to signal output circuit 153 to produce the counterclockwise motor command CCW. Open limit subroutine 605 is then complete and is exited via return block 807. This returns control to program 600 illustrated in FIG. 7.

If the motor is operating in the clockwise direction, open limit subroutine 605 causes the count stored within open limit up/down counter 510 to be incremented (processing 808). This is achieved by central processing unit 110 supplying an increment signal to travel limit circuit 163. Referring back to FIG. 6, the simultaneous receipt of the increment signal and the open limit input at And gate 511 causes the count within open limit up/down counter 510 to be incremented. In accordance with the preferred embodiment, incrementing this counter causes the open limit to move toward a less open position. Open limit subroutine 605 is then complete and is exited via return block 809, returning control to program 600 illustrated in FIG. 7.

If the open limit input is received when the motor is not operating, open limit subroutine 605 checks to determine whether or not the last motor operation was in the clockwise direction (processing block 810). If the last motor operation was not in the clockwise direction, that is the last motor operation was counterclockwise, then control of open limit subroutine 605 is transferred to processing block 805 which decrements the open limit. Thereafter the motor is operated in the counterclockwise direction (processing block 806) and subroutine 605 is exited via return block 807. If the last motor operation was in the clockwise direction then the open limit is incremented (processing block 811) and open limit subroutine 605 is exited via return block 814.

Open limit subroutine 605 illustrated in FIG. 9 provides a convenient method for adjusting the open travel limit of the door. If the door is now opening when the open limit button 30 is operated, then the open limit is shifted toward a more fully opened position. This is a shift in the direction of the current motion of the door. If the door has stopped but last moved in open direction then the open travel limit is changed toward a more fully opened position and the motor is operated to open. This causes the open travel limit to move in the direction of last motion of the door. Likewise, if the door is currently closing or the last motion of the door was in the closing direction then the open travel limit is moved toward the closing direction.

FIG. 10 illustrates in flow chart form a first embodiment of close limit subroutine 607. Close limit subroutine 607 is substantially similar to open limit subroutine 605, except that the directions of operation and the directions of movement of the close limit are reversed.

Close limit subroutine 607 is entered when decision block 606 determines that the close limit signal has been received. Close limit subroutine 607 is begun via start block 901. Close limit subroutine 607 then determines whether or not the motor is operating (decision block 902). If the motor is currently operating, then close limit subroutine 607 tests to determine whether or not the motor is moving in the clockwise direction (decision block 903). If the motor is now operating clockwise, then close limit subroutine 607 causes the motor to be stopped (processing block 904). Close limit subroutine 607 then increments the close limit count (processing block 905). This causes the close limit stored within close limit up/down counter 510 to correspond to a more fully closed position. Close limit subroutine 607 then operates the motor in the clockwise direction (processing block 906). Close limit subroutine 607 is then complete and is exited via return block 907. This returns control to program 600 illustrated in FIG. 7.

If the motor is operating in the counterclockwise direction, close limit subroutine 607 causes the count stored within close limit up/down counter 510 to be decremented (processing 908). Decrementing this counter causes the close limit to move toward a less closed position. Close limit subroutine 607 is then complete and is exited via return block 909, returning control to program 600 illustrated in FIG. 7.

If the close limit input is received when the motor is not operating, close limit subroutine 607 checks to determine whether or not the last motor operation was in the clockwise direction (processing block 910). If the last motor operation was clockwise, then control of close limit subroutine 607 is transferred to processing block 905 which increments the close limit. Thereafter the motor is operated in the clockwise direction (processing block 906) and subroutine 607 is exited via return block 907. If the last motor operation was in the counterclockwise direction then the close limit is decremented (processing block 911) and close limit subroutine 607 is exited via return block 914.

This system provides a relatively easy means for the operator to set the close travel limit. Operation of the close limit switch 40 causes the close limit to move incrementally in the current direction of door travel if the door is moving, or in the direction of the last door travel in the door is stopped. This operation is intuitive and easy to understand.

Figure 12:
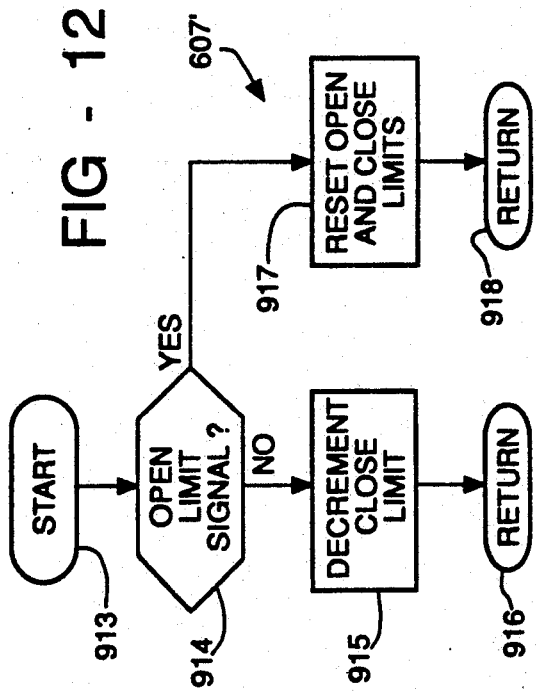
FIG. 12 illustrates in flow chart form an alternative embodiment of the close limit subroutine illustrated in FIG. 7.

FIGS. 11 and 12 illustrate an alternative embodiment of open limit subroutine 605 and close limit subroutine 607, respectively. These flow charts represent an alternative set of operation sequences for setting the open and close travel limits.

Alternative open limit subroutine 605, illustrated in FIG. 11 is entered when decision block 604 determines that the open limit signal has been received. Open limit subroutine 605' is begun via start block 813 and next tests to determine if the close limit signal from close limit switch 40 is also being received (decision block 814). If this is not the case, then the open limit is incremented (processing block 815) causing it to move toward a more fully open position. Then control is returned to program 600 via return block 816. If, on the other hand, both the open and close signals are received simultaneously then both the open and close travel limits are reset in accordance with the values stored in reset circuits 515 and 525, respectively. Control then is returned to program 600 via return block 818.

Alternate close limit subroutine 607' is similar to open limit subroutine 605'. It is begun via start block 913 and first tests to determine if the open limit signal is also being received (decision block 914). If not, then the close travel limit is decremented (processing block 915) moving this limit toward more fully closed and control returns to program 600 via return block 916. If both these limit signals are received, then both travel limits are reset (processing block 917) and control returns to program 600 via return block 918.

The alternate subroutines illustrated in FIGS. 11 and 12 are intended for use together. Activation of one of the limit switches causes the corresponding travel limit to move to a more extreme position. Simultaneously activation of both limit switches causes both travel limits to be reset, enabling these limits to be changed from the reset positions which are preferably less extreme than any particular installation would require.

Figure 13:
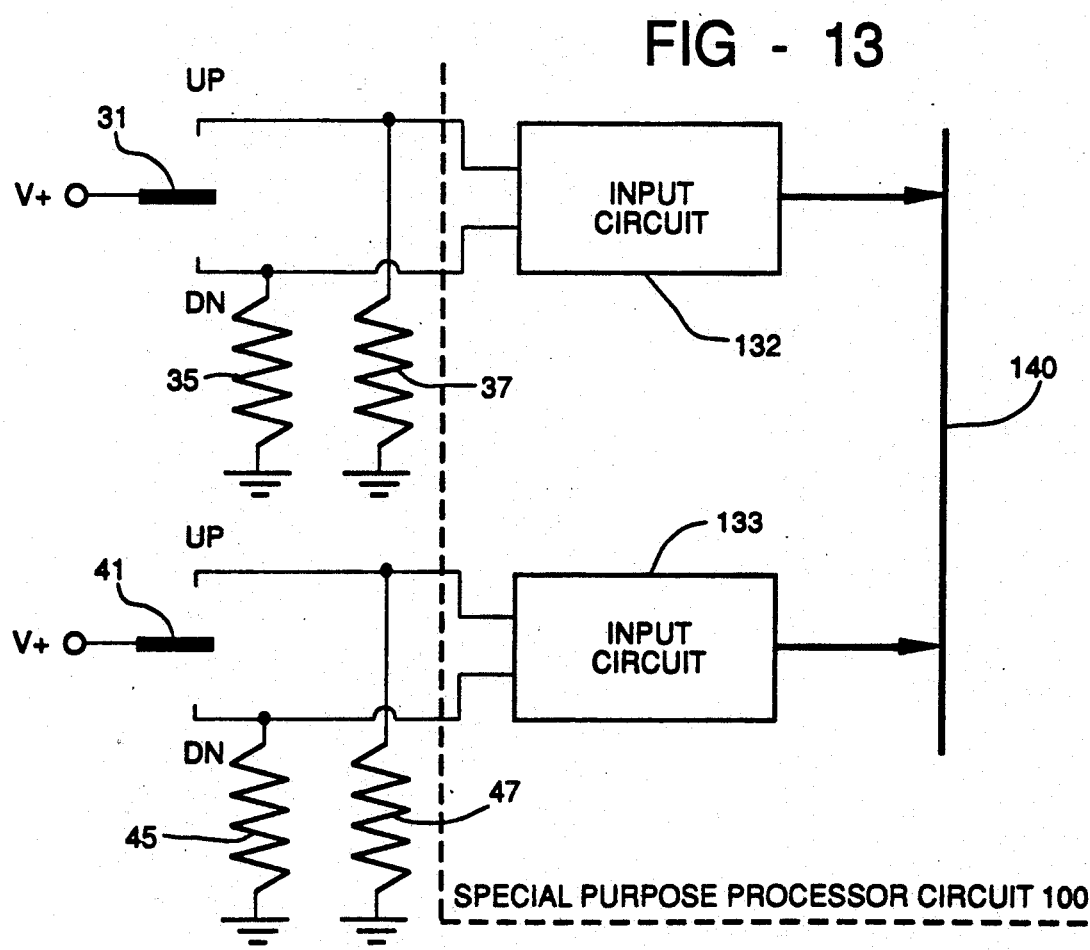
FIG. 13 illustrates in schematic diagram form an alternative embodiment of the open and close limit switches illustrated in FIG. 1.
Figure 14:
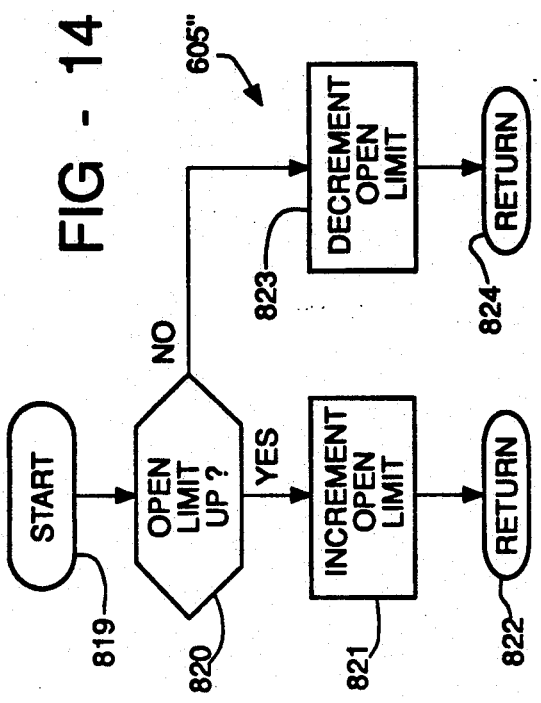
FIG. 14 illustrates in flow chart form an alternative embodiment of the open limit subroutine illustrated in FIG. 7 suitable for use with the open and close limit switches illustrated in FIG. 13.
Figure 15:
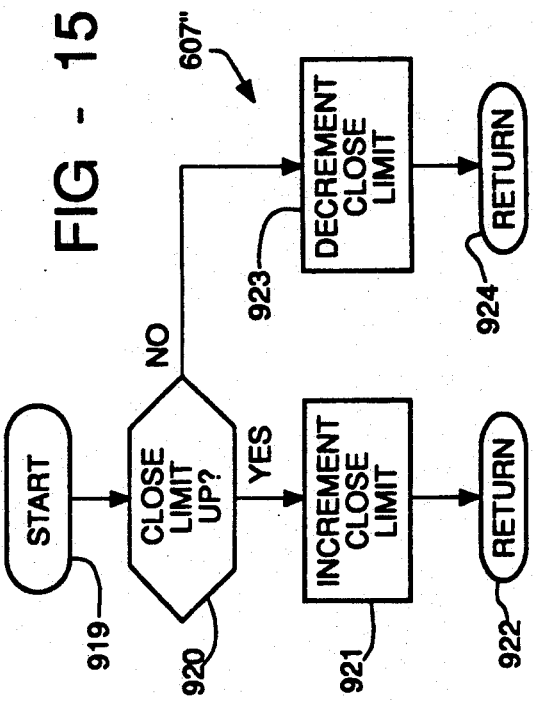
FIG. 15 illustrates in flow chart form an alternative embodiment of the close limit subroutine illustrated in FIG. 7 suitable for use with the open and close limit switches illustrated in FIG. 13.

FIG. 13 illustrates an alternative embodiment for open limit switch 30 and close limit switch 40 intended for use in conjunction with alternate open limit subroutine 605" illustrated in FIG. 14 and alternate close limit subroutine 607" illustrated in FIG. 15. In FIG. 13, open limit switch 30 is embodied by a three position switch 31 coupled to special purpose processor circuit 100 having first and second momentary contact positions and a center off position. FIG. 13 labels these two momentary contact positions as UP and DN. Momentary activation of switch 31 to the UP position applies a digital "high" signal to a first input of input circuit 132, which is a part of special purpose processor circuit 100. Otherwise, resistor 35 insures that this input receives a digital "low" signal. Likewise momentary activation of switch 31 to the DN position applies a digital "high" signal to the other input of input circuit 132 which would otherwise receive a digital "low" signal via resistor 37. Input circuit 132 provides appropriate signals on input/output bus 140 indicating the status of these inputs. Switch 41 is similar to switch 31 and is coupled in a similar manner to input circuit 133.

Alternate open limit subroutine 605" illustrated in FIG. 14 is employed in conjunction with the construction illustrated in FIG. 13. Open limit subroutine 605" is begun via start block 819. This subroutine first tests to determine if switch 31 is in the UP position (decision block 820). If so, then the open travel limit is incremented (processing block 821) moving this limit toward more fully open and open limit subroutine 605" is exited via return block 822. If not, then switch 31 is in the DN position and the open travel limit is decremented (processing block 823) moving this limit toward less fully open and open limit subroutine 605" is exited via return block 824.

Alternate close limit subroutine 607" illustrated in FIG. 15 is similar to alternate open limit subroutine 605" illustrated in FIG. 14. Close limit subroutine 607" is begun via start block 919. This subroutine first tests to determine if switch 41 is in the UP position (decision block 920). If so, then the close travel limit is incremented (processing block 921) moving this limit toward less fully closed and close limit subroutine 607" is exited via return block 922. Otherwise, the close travel limit is decremented (processing block 923) moving this limit toward more fully closed and close limit subroutine 607" is exited via return block 924.

The alternative subroutines illustrated in FIGS. 14 and 15 are another intuitive and easy manner of adjusting the open and close travel limits. Activation of the UP position of one of the switches 31 or 41 moves the corresponding travel limit up, i.e. toward the open position. Activation of the DN position moves the corresponding travel limit down toward the closed position. This control technique is easy for a naive user to understand and use.

Figure 16A:
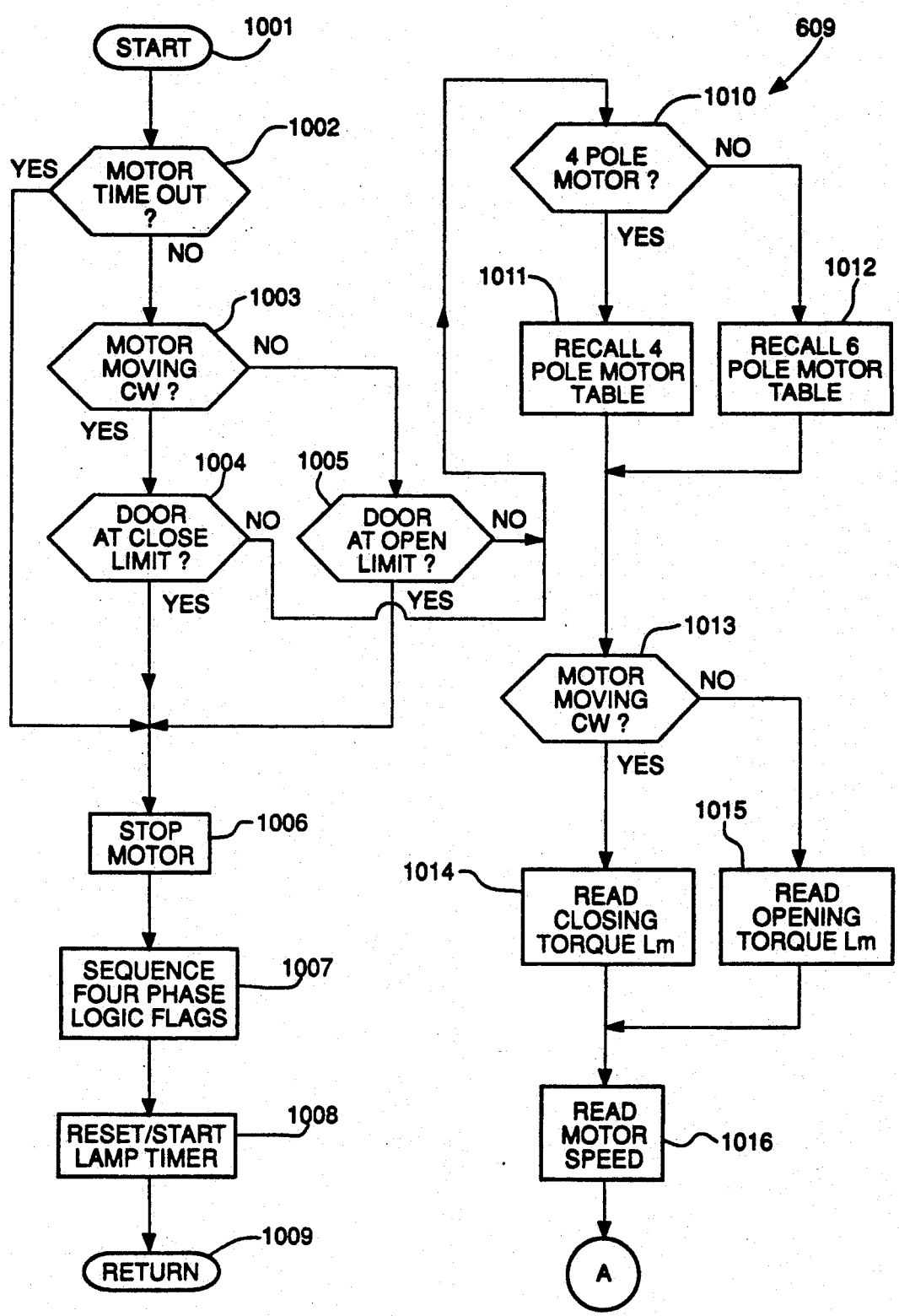
FIGS. 16a and 16b illustrate in flow chart form the motor operation subroutine illustrated in FIG. 6.
Figure 16B:
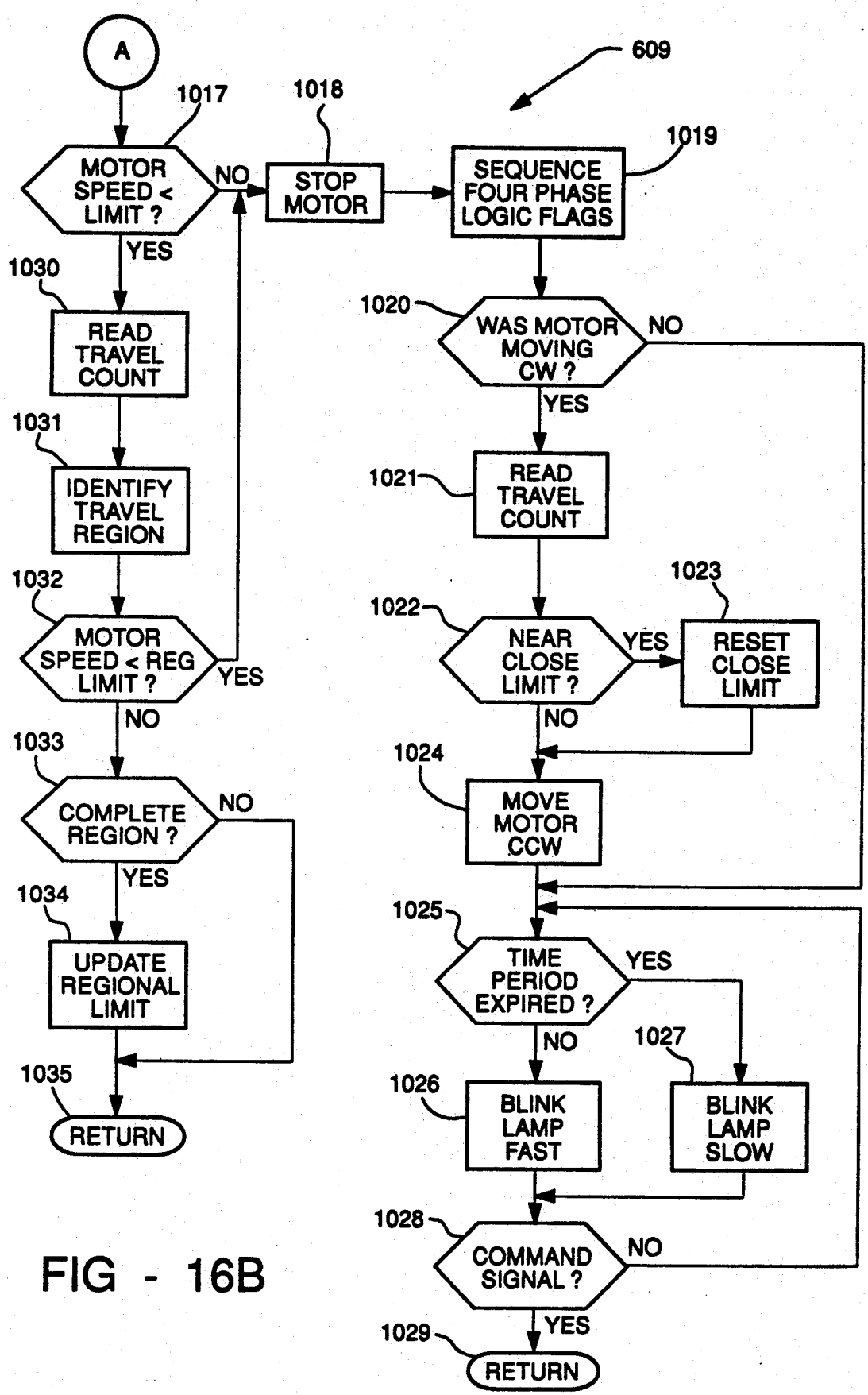

FIGS. 16a and 16b illustrate in flow chart form the motor operation subroutine 609. Referring now to FIG. 16a, motor operation subroutine 609 is begun via start block 1001. Motor operation subroutine 609 first tests to determine whether a motor time out has occurred (decision block 1002). Recall that processing block 707 (FIG. 8) started this motor interval timer upon initial operation of motor 91 within command input subroutine 603. Central processing unit 110 reads the current time from clock 115 and compares this time with the time from clock 115 stored in random access memory 123 to determine whether this interval has expired. If this motor time out period has expired then control of motor operation subroutine 609 skips to processing block 1006 to stop the motor.

If the motor time out function has not expired then motor operation subroutine 609 tests to determine whether or not the motor is moving in the clockwise direction (decision block 1003). This test is made in conjunction with the Up or Down output produced by pulse counting circuit 161. If the motor is operating in the clockwise direction, motor operation subroutine 609 tests to determine whether or not the close limit signal is being produced (decision block 1004). As explained above, travel limit circuit 163 generates the close limit signal when the door reaches or passes the close limit stored in close limit up/down counter 520. On the other hand, if the motor is not operating in the clockwise direction, motor operation subroutine 609 tests to determine whether or not the open limit signal is being generated (decision block 1005). The open limit signal is likewise generated by travel limit circuit 163.

If either a motor time out has occurred or the door has reached either the close limit or the open limit, then the door must be stopped (processing 1006). Central processing unit 110 signals output circuit 153 via input/output bus 140 to generate the Brake command. Upon receipt of this Brake command motor control circuit 90 dynamically brakes motor 91, thereby stopping the motor and the door. Motor operation subroutine 609 next sequences the four-phase logic flags (processing 1007). Motor operation subroutine 609 next resets and starts the lamp timer (processing 1008). This process involves capturing the current time produced by clock 115 in order to start the predetermined interval of time that lamp 85 remains illuminated after stopping the motion of the motor 91. Motor operation subroutine 609 is now complete and is exited via return block 109. This returns control of the automatic door operator to program 600 illustrated in FIG. 7.

If neither a motor time out, nor the door arriving at either the close limit or the open limit has occurred, then motor operation subroutine 609 performs an obstruction detection. Motor operation subroutine 609 first tests to determine whether or not motor type selection switch 50 is in a position to select a four-pole motor (decision block 1100). In accordance with the preferred embodiment of the present invention a single special purpose processor circuit 100 is constructed for control both four-pole motors and six-pole motors. It is known in the art that four-pole motors have differing speed versus torque characteristics than six-pole motors. A four-pole motor typically generates less torque for any given speed than a six-pole motor. In accordance with the present invention, special purpose processor circuit 100 includes stored within read only memory 121 a table of motor speeds corresponding to each of the possible operator selected closing torque limits and opening torque limits for four-pole motors and a similar set of speeds for six-pole motors. If input circuit 134 indicates that motor type selection switch 50 has not been closed then motor operation subroutine 1011 recalls the speeds corresponding to a four-pole motor (processing 1011). On the other hand if motor type selection switch 50 is closed, input circuit 134 indicates selection of a six pole motor. In this event, the speeds corresponding to the six-pole motor are recalled from read only memory 121 (decision block 1012). Note that the connection between motor type selection switch 50 and input circuit 134 has been constructed in order that the table corresponding to a four-pole motor is selected upon failure of the operator to make a selection via motor type selection switch 50. Because a four pole motor develops less torque at each speed, this default selection is safer than the speeds corresponding to a six-pole motor.

Motor operation subroutine 609 next tests to determine whether or not the motor is moving in the clockwise direction (decision block 1013). As explained above, this test is made by determining whether pulse counting circuit 161 is producing Up pulses or Down pulses. If the motor is operating clockwise, motor operation subroutine 609 reads from closing torque limits input circuit 60 the selected closing torque limit (processing 1014). On the other hand if the motor is currently operating in the counterclockwise direction, motor operation subroutine 609 reads the currently selected opening torque limit from opening torque limits input circuit 70 (processing block 1015). In either event, motor operation subroutine 609 next determines the motor speed (processing block 1016). This determination of the motor speed is made by timing the Up or Down pulses produced by pulse counting circuit 161. Central processing unit 110 performs this function in conjunction with time signals received from clock 115.

Motor operation subroutine 609 is now gathered all the information for making the obstruction detection. Referring now to FIG. 16b, motor operation subroutine 609 tests to determine whether the motor speed is less than the limit speed for the particular number of motor poles selected and for the particular operator selected torque limit (decision block 1017). If this is the case, then motor 91 is developing a greater torque than permitted by the established limit. Therefore, motor operation subroutine 609 stops the motor (processing block 1018) and sequences the four-phase logic flags (processing block 1019).

Motor operation subroutine 609 next tests to determine whether or not the motor was moving in the clockwise direction (decision block 1020). This determination is made by whether the pulse counting circuit 161 was last generating Up pulses or Down pulses. If the motor was operating in the clockwise direction, that is closing the door, then motor operation subroutine 609 reads the travel count stored within travel up/down counter 500 (processing block 1021). This current travel count is compared with the close travel limit to determine if the door is near the close limit (decision block 1022). This comparison is made by determining whether the current travel count is within a predetermined count of the close travel limit. If this is the case, then the close travel limit is reset to a predetermined count less than the current travel count (processing block 1023). This process serves to enable the close travel limit to be periodically reset to track accumulation of foreign objects, such as snow or dirt, on the floor. The motor is again operated in the counterclockwise direction (processing block 1021). Thus, the door is stopped if an obstruction is detected during opening and is stopped and reversed if an obstruction is obtained during closing.

For the case of residential garage door operators an Underwriters Laboratory standard requires that the door operator be able to detect a one inch high obstruction and reverse the door. The proper close travel limit to satisfy this requirement can be easily determined when the just described portion of the motor operation subroutine is employed. Using the close limit switch 30 the installer adjusts the close travel limit to just beyond the location of the floor. Then the installer closes the door using the operator. The automatic door operator will detect an obstruction at the floor and will stop and reverse the door. At the same time the close travel limit will be set to a predetermined count less than the floor position. Proper selection of this predetermined count, for example corresponding to a door travel of approximately one half inch, provides the proper close travel limit to detect an obstruction one inch off the floor. This predetermined count may be permanently stored in read only memory 121 or may be set by selection of jumpers or switches in the manner of motor pole selection switch 50.

In any event, motor operation subroutine 609 causes lamp 85 to blink. Motor operation subroutine 609 tests to determine if a predetermined time has elapsed since the detection of the obstruction (decision block 1025). This predetermined time is preferably about thirty seconds. If this time interval has not expired then the lamp 85 is set to blink at a fast rate (processing block 1026). If this time interval has expired, then lamp is set to blink at a slow rate (processing block 1027). In either case, this blinking is achieved by periodically causing output circuit 151 to generate the On signal and then generate the Off signal to lamp driver circuit 80. Blinking lamp 85 serves to alert the operator that an obstruction has been detected. The change between a fast blink cycle and a slow blink cycle is made to prevent excessive use and possible premature failure of lamp driver circuit 80.

Motor operation subroutine 609 then tests to determine if a command signal is received (decision block 1028). In accordance with this example, the automatic door operator continues to blink lamp 85 until a clearing command signal is received. Thus control of motor operation subroutine 609 returns to decision block 1025 to continue to blink lamp 85 until such a command signal is received. Upon receipt of this command signal motor operation subroutine 609 is complete and is exited via return block 1029. This returns control of the automatic door operator to program 600 illustrated in FIG. 7.

If the motor speed is not less than the corresponding operator selected limit for the particular number of motor poles, motor operation subroutine 609 reads the travel count from travel limit circuit 163 (processing block 1030). Motor operation subroutine 609 next determines the travel region within the range of travel counts (processing block 1031). In accordance with the present invention both the opening and closing travel of the door are divided into a plurality of regions, corresponding generally to differing average torques during normal operation. It is contemplated that a differing number of regions may be employed for division of the opening travel than for division of the closing travel. In any event, motor operation subroutine 609 identifies the particular travel region.

In accordance with the preferred embodiment of the present invention the number of opening travel regions and the number of closing travel regions are fixed. Because the exact travel count for any particular installation will vary, the travel regions are preferably set based upon fractions of the count between the open limit and the closed limit. Thus identification of the travel regions involves comparison of the region boundaries expressed in fractions of full travel with:

$$\frac{TC - OL}{CL - OL}$$

where: TC is the current travel count within travel up/down counter 500; OL is the open limit count within open limit up/down counter 510; and CL is the close limit count within close limit up/down counter 520.

Each such travel region includes an adaptive torque limit stored in a corresponding location within random access memory 123 or electrically alterable programmable read only memory 125. The identification of the particular travel region thus also identifies a particular adaptive torque limit. Motor operation subroutine 609 then tests to determine whether the motor speed is less than this identified regional adaptive limit (decision block 1032). If this is the case, then control of motor operation subroutine 609 branches to processing block 1018 to stop the motor in a manner previously described. Note that this operation detects an obstruction based upon the lesser of the operator selected torque limit and the adaptive torque limit for the particular region.

If the motor speed is not less than the adaptive limit for that particular region, that is the door operation is proceeding normally, then motor operation subroutine 609 tests to determine whether travel through a particular region has just been completed (decision block 1033). In accordance with the present invention these regional limits are adapted each time the door is operated in order to provide an updated limit for the particular region. If a region has just been completed, then the regional adaptive torque limit is updated (processing block 1034). This process takes place by a combination of the prior regional adaptive torque limit and the average motor speed for the just completed travel through that region. In accordance with the present invention the new regional adaptive torque limit corresponds to the weighted sum of the prior regional adaptive torque limit and the average speed through that region. Thus the new regional adaptive torque limit is determined as follows:

$$AL_{(i,new)} = (1 - W) \times AL_{(i,old)} + W \times M \times Sp$$

where: $AL_{(i,new)}$ is the new adaptive torque limit for region i; W is a weighting factor, $0 < W < 1$, with W preferably about 0.15; $AL_{(i,old)}$ is the prior adaptive torque limit for region i; M is a margin factor greater than 1 and preferably about 1.10; and Sp is the average motor speed within region i. In accordance with the present invention these regional adaptive torque limits are stored within electrically alterable programmable read only memory 125. Because such memories have a limited number of write operation cycles, the regional adaptive torque limits are updated only when a region has been passed. In any event, motor operation subroutine 609 is completed and is exited via return block 1035. This returns control to program 600 illustrated in FIG. 7.

Figure 17:
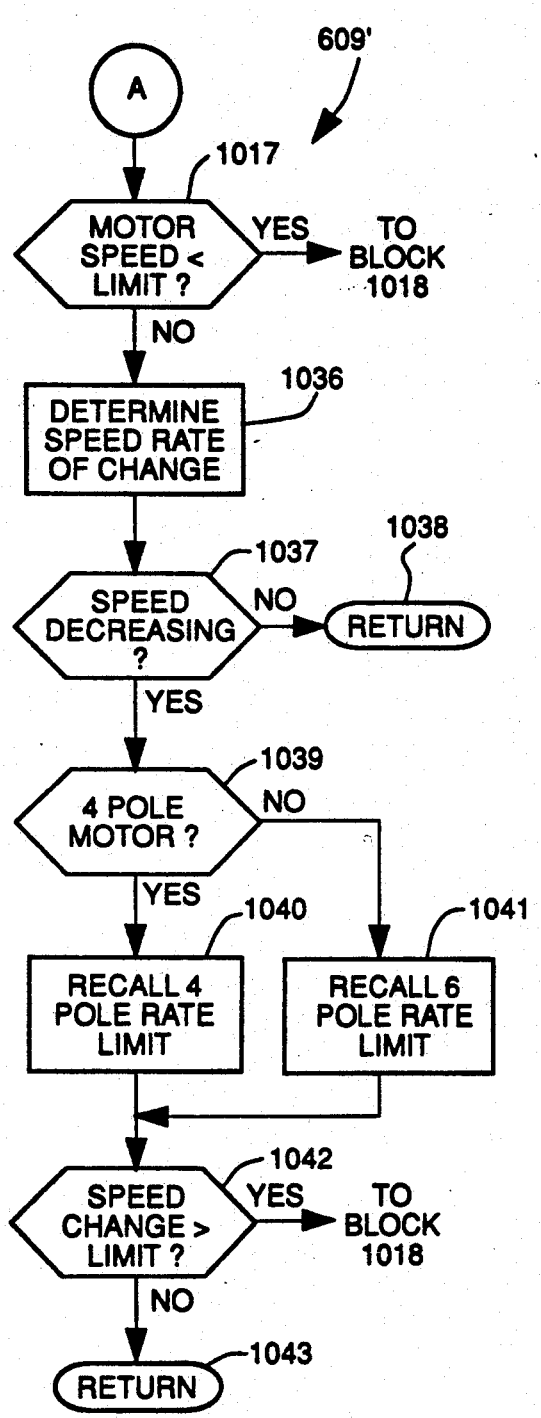
FIG. 17 illustrates in flow chart form an alternative embodiment of a portion of the motor operation subroutine illustrated in FIG. 16B.

FIG. 17 illustrates a section of an alternative motor operation subroutine 609'. The portion of alternative motor operation subroutine 609' illustrated in FIG. 17 is intended for substitution for steps 1017 and 1030 to 1035 illustrated in FIG. 16B. If decision block 1017 determines that the current motor speed is less than the motor speed corresponding to the torque limit, then this portion of alternative motor operation subroutine 609' is used. Otherwise motor operation subroutine 609' passes control to block 1018 in the manner previously described.

Alternative motor operation subroutine 609' determines the rate of change of motor speed (processing block 1036) by comparison of the current motor speed with a prior motor speed. The subroutine next tests to determine if the motor speed is decreasing (decision block 1037). If this is not the case, then the motor operation is proceeding normally and alternative motor operation subroutine 609' is exited via return block 1038. If the motor speed is decreasing, alternative motor operation subroutine 609' checks the status of motor pole selection switch 50 to determine if four-pole motor operation is selected (decision block 1039). Depending on the results of this test a torque rate of change limit for a four-pole motor is recalled (processing block 1040) or a torque rate of change limit for a six-pole motor is recalled (processing block 1041). Alternative motor operation subroutine 609' then checks if the last determined rate of change of motor speed exceeds the recalled limit (decision block 1042). If this is not the case, then the motor operation is normal and alternative motor operation subroutine 609' is exited via return block 1043. If this is the case, control passes to processing block 1018 to change the motor operation based upon an obstruction detection.

Figure 18:
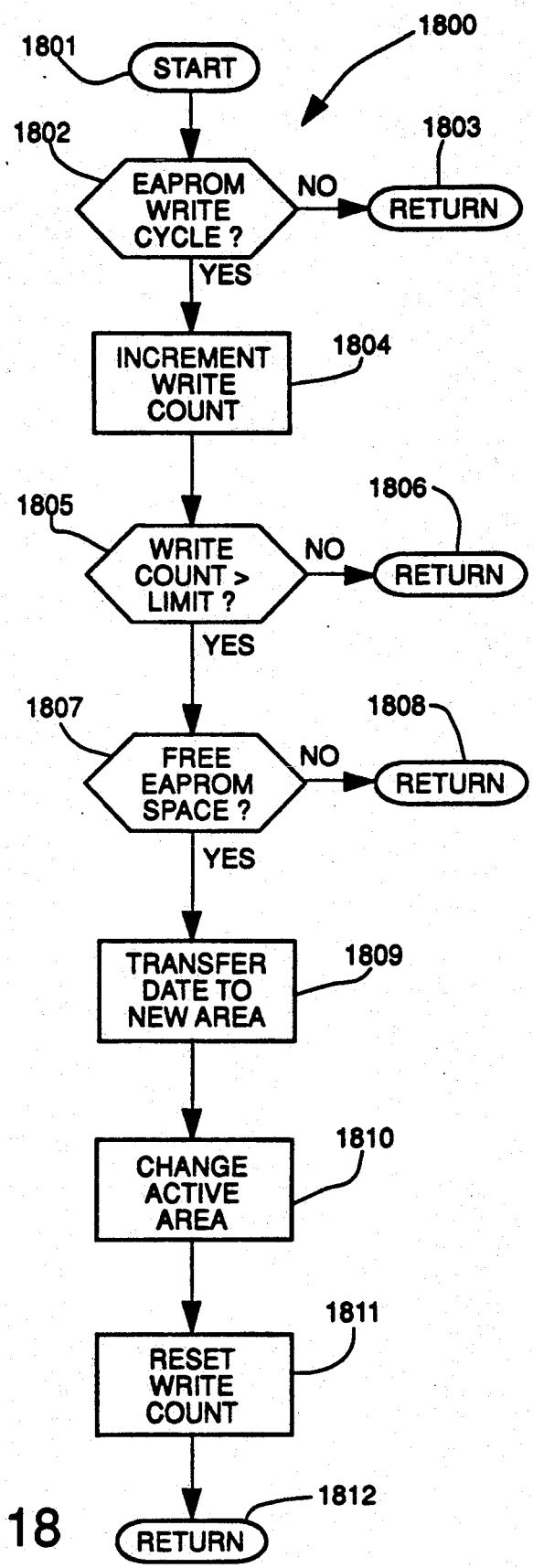
FIG. 18 illustrates in flow chart form a subroutine for extending the effective life of the electrically alterable programmable read only memory illustrated in FIG. 1.

FIG. 18 illustrates in flow chart form a subroutine for extending the effective life of the electrically alterable programmable read only memory 125. Electrically alterable programmable read only memory 125 is employed to store quantities that are known to change slowly or infrequently. Examples of such data include the open ans close travel limits, the regional adaptive torque limits and perhaps even the travel count. Electrically programmable read only memory 125 permits this data to be retained even if special purpose processor circuit 100 loses electrical power. As previously noted, electrically alterable programmable read only memory 125 has a limited number of write cycles. This limited number of write cycles limits the useful life of special purpose processor circuit 100. This technique requires that electrically alterable read only memory 125 have a severalfold larger data capacity than needed to store all the data to be preserved during loss of electrical power.

Memory cycle subroutine 1800 is executed once each memory write operation. Memory cycle subroutine 1800 begins via start block 1801 and first tests to determine whether the memory write is a write to electrically alterable read only memory 125 (decision block 1802). If this is not the case, then no action is required and memory cycle subroutine 1800 is exited via return block 1803.

Memory cycle subroutine 1800 continues if the write operation was a write to electrically alterable read only memory 125. Memory cycle subroutine 1800 increments a write count (processing block 1804). This write count may be stored in random access memory 123 but is preferrable also stored in electrically alterable read only memory 125. Memory cycle subroutine 1800 then tests to determine if the current write count exceeds a predetermined number (decision block 1805). This predetermined number is preferrably set at approximately 80% of the minimum number of write cycles of electrically alterable read only memory 125. No action is required if this is not the case, so memory cycle subroutine 1800 is exited via retrun block 1806.

In the event that the write count exceeds the predetermined number, then a memory transfer is perfomed. Memory cycle sutbroutine 1800 tests to determine is there is any free memory locations within electrically alterable read only memory 125 (decision block 1807). If no free space is available, this technique cannot be used and memory cycle subroutine 1800 is exited via return block 1808. If free space is available, then memory cycle subrroutine 1800 transfers all the essential data stored in electrically alterable read only memory 125 to a new area within electrically alterable read only memory 125 (processing block 1809). This transfer is to a new, previously unused area. All future write operations to electrically alterable read only memory 125 are then made to this new area (processing block 1810). The write count is then reset to zero (processing block 1811) and memory cycle subroutine is exited via return block 1812.

This process employs more electrically alterable read only memory 125 than otherwise required but extends the useful life of special purpose processor circuit 100. Each time the memory transfer takes place, a area of electrically alterable read only memory 125 is used with a new, previously unused number of write cycles. It is less expensive to produce special purpose processor circuit 100 with several times memory capacity within electrically alterable read only memory 125 than otherwise required than to replace this entire circuit at more frequent intervals.

FIG. 19 illustrates a preferred embodiment for powering pulse counting circuit 161 and travel limits circuit 163. FIG. 19 illustrates a portion of special purpose processor circuit 100 and some of the peripherial circuits. The primary electrical power source for special purpose processor circuit 100 (which may be an AC line powered supply) is coupled to power sensing circuit 172. Power sensing circuit 172 detects the availability of electric power from the primary power source. If electric power is available, power sensing circuit 172 supplies power to all circuits of special purpose processor circuit 100, and supplies an Off signal to power supply switch 174. Power supply switch 174 thus does not couple backup battery 170 to pulse counting circuit 161 and travel limits circuit 163 permitting these circuits to be powered via the primary power source. If the primary power source fails, then power senseing circuit 172 causes power switching circuit 174 to couple backup battery 170 to power pulse counting circuit 161 and travel limits circuit 163.

This technique permits power operation of the automatic door operator after recovery from a primary power source failure. The travel count stored within travel up/down counter 500 is preserved by this process. Thus the automatic door operator continues to remember the door location during primary power source failure. Note also that because pulse counting circuit 161 is also powered from backup battery 170, and because Hall effect sensor 95 requires no power for operation, travel limits circuit 163 continues to track movement of the door even during primary power source failure. Thus, for example, the user may manually open the door during a power failure and not have to reset the automatic door limits. Although not specifically mentioned above, it is preferrable that pulse countin circuit 161 and travel limits circuit 163 both operate even while the automatic door operator is quiescent to track manual door motion and coasting.

Installation and initial set up of the automatic door operator of the present invention occurs as follows. The automatic door operator is initially installed with the door in an intermediate position between fully opened and fully closed. In addition, the automatic door operator is constructed to open the door upon the first command input after initial application of electric power. The operator lets the preset count of reset count circuit 515 stop the door. In the typical new installation this limit will be less than the fully opened position. The operator will then advance the open limit by momentary activation of open limit pushbutton switch 30 according to the preferred embodiment. This causes the door to creep toward the advanced open limit. The operator continues to operate open limit pushbutton 30 until the desired open limit is reached. If the operator passes the desired open limit he can return this open limit by a second activation of the command input followed by a further activation of the open limit input. This serves to back up the open limit toward the close position. The operator can then twice more enter the command input to stop the door and then advance the door to the newly reset open limit. At that time the operator can further advance the open limit by repeating the process of depression of the open limit pushbutton switch 30. A similar procedure is employed for setting the close limit by employing the close limit input switch 40.

The automatic door operator as delivered from the factory includes the corresponding multipole magnet wheel 93 having the number of poles based upon the power line frequency to be employed. In the preferred embodiment a 60 Hz system employs a ten pole magnet and a 50 Hz system employs a 12 pole magnet. In any event a 60 Hz system will have 20% more poles than a 50 Hz system. The differing number of poles serves to match the operating frequency of the motor to the capacity of special purpose processor circuit 100 for detection of motor speed and location.

The operator may select via motor type selection switch 50 whether motor 91 is a four-pole motor or a six-pole motor. It is feasible of this to be a hidden switch with the automatic door operator delivered to the customer or installer with motor type selection switch 50 semipermanently placed in the location corresponding to the motor 91 of that particular system.

The torque limits are set as follows. Firstly, the operator activates the command input to cause the door to move. The operator starts by selecting the lowest torque limit. In a number of cases the lowest torque limit will not permit reliable operation of the door but will cause the automatic door operator to detect false obstructions. On successive operations of the door the operator selects higher and higher torque limits until the operator discovers the lowest torque limit which permits to the door to reliably operate. It is also desirable for the operator to physically test the torque limit by holding the door during operation to determine how much torque needs to be developed in order to trigger the obstruction detection.

The operator need not perform any operations for production of the adaptive torque limits corresponding to the particular regions. The number and fractional travel limits of these regions are set during manufacture. The adaptive torque limits are initialized during the first operations of the door and are slowly adapted during successive operations. The selection of the fractional travel limits, the weighting factor W and the margin factor M are made during manufacture of the special purpose processing circuit 110. In accordance with the alternative embodiment, an obstruction is detected when the motor exceeds a preset rate of change. The preset rate of change in motor speed is preferably different for four-pole motors.

I claim:

1. An automatic door operator for controlling a motor coupled for closing and opening a door, said automatic door operator comprising:

a motor speed detector coupled to the motor for detecting the speed of the motor;

means for independently setting opening and closing torque limits by a user including a user settable closing torque limit input device for selecting a closing torque limit and a user settable opening torque limit input device for selecting an opening torque limit; and a controller connected to said motor speed detector, said closing torque limit input device and said opening torque limit input device for controlling them motor to open and close the door, said controller including an obstruction detector operative to at least stop the motor to stop movement of the door when the detected motor speed indicates a closing motor torque greater than said selected closing torque limit when the motor is closing the door, and at least stop the motor to stop movement of the door when the detected motor speed indicates an opening motor torque greater than said selected opening torque limit when the motor is opening the door.

2. The automatic door operator as claimed in claim 1, wherein:

speed detector includes a rotation pulse generator coupled to a rotating shaft of the motor for producing electrical pulses corresponding to rotation of the shaft of the motor.

3. The automatic door operator as claimed in claim 2, wherein:

said motor speed detector further includes a counter connected to said pulse generator for generating a count pulse upon counting a predetermined number of said electrical pulses.

4. The automatic door operator as claimed in claim 3, wherein:

said predetermined number of said electrical pulses of said counter is eight.

5. The automatic door operator as claimed in claim 2, wherein said automatic door operator may optionally be installed for operation on 60 Hz AC power or 50 Hz AC power, and wherein:

the number of electrical pulses per each rotation of the shaft of the motor of said rotation pulse generator is selectable in manufacture, the selected number being a first number of pulses if said automatic garage door operator is installed for operation on 60 Hz AC power and being a second number of pulses if said automatic garage door operator is installed for operation on 50 Hz AC power, said second number of pulses being one fifth more than said first number of pulses.

6. The automatic door operator as claimed in claim 5, wherein:

said first number of pulses is 10 and said second number of pulses is 12.

7. The automatic door operator as claimed in claim 2, wherein:

said rotation pulse generator includes
a multipole magnet disposed for rotation with rotation of the shaft of the motor, and
at least one magnetic detector disposed in proximity to said multipole magnet for generating one of said electrical pulses upon rotation of each pole of said multipole magnet past said at least one magnetic detector.

8. The automatic door operator as claimed in claim 7, wherein:

said at least one magnetic detector comprises a Hall effect sensor.

9. The automatic door operator as claimed in claim 7, wherein said automatic door operator may optionally be installed for operation on 60 Hz AC power or 50 Hz AC power, and wherein:

said multipole has a number of poles selectable in manufacture, said number of poles being a first number of poles if said automatic door operator is installed for operation on 60 Hz AC power and being a second number of poles magnet if said automatic garage door operator is installed for operation on 50 Hz AC power, said second number of poles being one fifth more than said first number of poles.

10. The automatic door operator as claimed in claim 9, wherein:

said first number of poles is 10 and said second number of poles is 12.

11. The automatic door operator as claimed in claim 2, further comprising:

a travel counter connected to said rotation pulse generator for counting said electrical pulses;

an adaptive closing torque limit memory for storing an adaptive closing torque limit for each of a plurality of regions of door closing travel;

an adaptive opening torque limit memory for storing an adaptive opening torque limit for each of a plurality of regions of door opening travel; and said controller being further connected to said travel counter, said adaptive closing torque limit memory and said adaptive opening torque limit memory, said obstruction detector being further operative to determine the current region within said plurality of regions door closing travel from a count of said travel counter when the motor is closing the door, determine the current region within said plurality of regions door opening travel from said count of said travel counter when the motor is opening the door, store in said adaptive closing torque limit memory for each of said plurality of regions of door closing travel a new adaptive closing torque limit upon each closing of the door, said new adaptive closing torque limit being a weighted sum of said prior adaptive closing torque limit for the corresponding region of door closing travel and the actual torque corresponding to an average motor speed signal for said region of door closing travel, store in said adaptive opening torque limit memory for each of said plurality of regions of door opening travel a new adaptive opening torque limit upon each opening of the door, said new adaptive opening torque limit being a weighted sum of said prior adaptive opening torque limit memory for the corresponding region of door closing travel and the actual torque corresponding to an average motor speed signal for the said region of door opening travel, when the motor is closing the door at least stop the motor to stop movement of the door when the detected motor speed indicates a closing motor torque greater than the lesser of 1) said closing torque limit selected by said operator settable closing torque limit input device and 2) said adaptive closing torque limit stored in adaptive closing torque limit memory for the current region of door closing travel, and when the motor is opening the door at least stop the motor to stop movement of the door when the detected motor speed indicates an opening motor torque greater than the lesser of 1) said opening torque limit selected by said operator settable opening torque limit input device and 2) said adaptive opening torque limit stored in adaptive opening torque limit memory for the current region of door opening travel.

12. The automatic door operator as claimed in claim 11, wherein:

said obstruction detector calculates said new adaptive closing torque limit as follows:

$$ACL_{(i,new)} = (1 - W_c) \times ACL_{(i,old)} + W_c \times M_c \times S_p$$

where: $ACL_{(i,new)}$ is the new adaptive closing torque limit for region i; $W_c$ is a closing weighting factor, $0 < W_c < 1$; $ACL_{(i,old)}$ is the prior adaptive closing torque limit for region i; $M_c$ is a closing margin factor greater than 1; and $S_p$ is the average motor speed during closing within region i, and calculates said new adaptive opening torque limit as follows:

$$AOL_{(i,new)} = (1 - W_o) \times AOL_{(i,old)} + W_o \times M_o \times SP$$

where: $AOL_{(i,new)}$ is the new adaptive opening torque limit for region i; $W_o$ is a opening weighting factor, $0 < W_o < 1$; $AOL_{(i,old)}$ is the prior adaptive opening torque limit for region i; $M_o$ is a opening margin factor greater than 1; and $S_p$ is the average motor speed during opening within region i.

13. The automatic door operator as claimed in claim 11, further comprising:

a close travel memory for storing therein a close travel count corresponding to movement of the door to a fully closed position;

an open travel memory for storing therein an open travel count corresponding to movement of the door to a fully opened position; and wherein said controller is further connected to said close travel memory and said open travel memory and include travel limit means operative to stop the motor to stop movement of the door when said count of said travel counter reaches said close travel count when closing the door, and stop the motor to stop movement of the door when said count of said travel counter reaches said open travel count when opening the door.

14. The automatic door operator as claimed in claim 11, further comprising:

a backup power supply for powering at least said rotation pulse generator and said travel counter during failure of primary electric power.

15. The automatic door operator as claimed in claim 11, further comprising:

an electrically alterable programmable read only memory for storing predetermined data including at least said adaptive closing torque limit memory and said adaptive opening torque limit memory, said electrically alterable programmable read only memory having data storage capacity at least twice as great as required by said predetermined data; and a write cycle means connected to said electrically alterable programmable read only memory operative to count the number of write cycles to said electrically alterable programmable read only memory, and transfer said predetermined data to a previously unused portion of said electrically alterable programmable read only memory, change all access of said predetermined data to said previously unused portion of said electrically alterable programmable read only memory, and reset said count of the number of write cycles when said count of the number of write cycles exceeds a predetermined number.

16. The automatic door operator as claimed in claim 2, further comprising:

a travel counter connected to said rotation pulse generator for counting said electrical pulses;

a closing torque rate of change limit memory for storing a closing torque rate of change limit for each of a plurality of regions of door closing travel;

an opening torque rate of change limit memory for storing an opening rate of change torque limit for each of a plurality of regions of door opening travel; and said controller being further connected to said travel counter, said closing torque rate of change limit memory and said opening torque rate of change limit memory, said obstruction detector being further operative to determine the current region within said plurality of regions door closing travel from a count of said travel counter when the motor is closing the door, determine the current region within said plurality of regions door opening travel from said count of said travel counter when the motor is opening the door, continuously determine the rate of change of motor speed when the motor is closing the door, when the motor is closing the door at least stop the motor to stop movement of the door when the detected rate of change of motor speed indicates a closing rate of change of motor torque greater than said closing torque rate of change limit stored in said closing torque rate of change limit memory for the current region of door closing travel, continuously determine the rate of change of motor speed when the motor is opening the door, and when the motor is opening the door at least stop the motor to stop movement of the door when the detected rate of change of motor speed indicates an opening rate of change of motor torque greater than said opening torque rate of change limit stored in said opening torque rate of change limit memory for the current region of door opening travel.

17. The automatic door operator as claimed in claim 2, further comprising:

a travel counter connected to said rotation pulse generator for counting said electrical pulses;

a close travel memory for storing therein a close travel count corresponding to movement of the door to a fully closed position;

an open travel memory for storing therein an open travel count corresponding to movement of the door to a fully opened position; and wherein said controller is further connected to said travel counter, said close travel memory and said open travel memory and includes travel limit means operative to stop the motor to stop movement of the door when said count of said travel counter reaches said close travel count when closing the door, and stop the motor to stop movement of the door when said count of said travel counter reaches said open travel count when opening the door.

18. The automatic door operator as claimed in claim 17, further comprising:

an operator settable close travel count input device for setting said close travel count;

an operator settable open travel count input device for setting said open travel count.

19. The automatic door operator as claimed in claim 17, further comprising:

a backup power supply for powering at least said rotation pulse generator and said travel counter during failure of primary electric power.

20. The automatic door operator as claimed in claim 17, further comprising:

an electrically alterable programmable read only memory for storing predetermined data including at least said close travel count memory and said open travel count memory, said electrically alterable programmable read only memory having data storage capacity at least twice as great as required by said predetermined data; and a write cycle means connected to said electrically alterable programmable read only memory operative to count the number of write cycles to said electrically alterable programmable read only memory, and transfer said predetermined data to a previously unused portion of said electrically alterable programmable read only memory, change all access of said predetermined data to said previously unused portion of said electrically alterable programmable read only memory, and reset said count of the number of write cycles when said count of the number of write cycles exceeds a predetermined number.

21. The automatic door operator as claimed in claim 1, wherein:

said user settable closing torque limit input device includes first manually operable means for selecting one of a first plurality of predetermined closing torque limits; and said user settable opening torque limit input device includes second manually operable means for selecting one of a second plurality of predetermined opening torque limits, said first plurality of predetermined closing torque limits being greater in number than said second plurality of predetermined opening torque limits.

22. The automatic door operator as claimed in claim 21, wherein:

said first manually operable means consists of a first plurality of first electrical connectors equal in number to the number of said first plurality of predetermined closing torque limits and a first mating connector user connectable with only one of said first electrical connectors; and said second manually operable means consists of a second plurality of second electrical connectors equal in number to the number of said second plurality of predetermined opening torque limits and a second mating connector user connectable with only one of said second electrical connectors.

23. The automatic door operator as claimed in claim 21, wherein:

said first manually operable means consists of a first multiposition switch having a first plurality of switch positions equal in number to the number of said first plurality of predetermined closing torque limits; and said second manually operable means consists of a multiposition switch having a second plurality of switch positions equal in number to the number of said second plurality of predetermined opening torque limits.

24. The automatic door operator as claimed in claim 21, wherein:

said first plurality of predetermined closing torque limits consists of eight predetermined closing torque limits; and said second plurality of predetermined opening torque limits consists of four predetermined opening torque limits.

25. The automatic door operator as claimed in claim 21, wherein said automatic door operator may optionally be installed employing either a four-pole motor or a six-pole motor, said automatic door operator further comprising:

a motor type manual selection input device for indicating that said automatic door operator is installed employing the four-pole motor or employing a six-pole motor;

a torque limit table memory having predetermined torque limits stored therein for each of said first plurality predetermined closing torque limits for the four-pole motor, each of said second plurality of predetermined opening torque limits for the four-pole motor, each of said first plurality of predetermined closing torque limits for the six-pole motor, and each of said second plurality of predetermined opening torque limits for the six-pole motor; and wherein said controller is further connected to said motor type manual selection input device and said torque limit table memory and further includes torque limit table recall means operative to recall said closing torque limit from said torque limit table memory corresponding to said selection of said first manually operable means and the indication of said motor type manual selection input device, and recall said opening torque limit from said torque limit table memory corresponding to said selection of said second manually operable means and the indication of said motor type manual selection input device.

26. The automatic door operator as claimed in claim 25, wherein:

said motor type manual selection input device is constructed for indicating that said automatic door operator is installed employing the four-pole motor upon failure of the operator to make a selection of motor type; and said predetermined torque limits stored in said torque limit table memory include a first plurality of predetermined closing torque limits for the four-pole motor which are less than the corresponding first plurality of predetermined closing torque limits for the six-pole motor, and a second plurality of predetermined opening torque limits for the four-pole motor which are less than the corresponding second plurality of predetermined opening torque limits for the six-pole motor; and wherein said torque limit table recall means, upon failure of the operator to make said selection of motor type, is operative to recall from said torque limit table memory said closing torque limit corresponding to said selection of said first manually operable means for the four-pole motor, and recall from said torque limit table memory said opening torque limit corresponding to said selection of said second manually operable means for the four-pole motor.

27. The automatic door operator as claimed in claim 1, wherein:

said operator settable closing torque limit input device includes a first potentiometer having a manually operable resistance setting, and a first analog to digital convertor connected to said first manually operable potentiometer for generating a first digital indication of said manually operable resistance setting of said first potentiometer;

said operator settable opening torque limit input device includes a second potentiometer having a manually operable resistance setting, and a second analog to digital convertor connected to said second manually operable potentiometer for generating a second digital indication of said manually operable resistance setting of said second potentiometer; and said obstruction detector further operative to convert said digital indication of said manually operable resistance setting of said first potentiometer into a corresponding closing torque limit having a first range, and convert said digital indication of said manually operable resistance setting of said second potentiometer into a corresponding opening torque limit having a second range less that said first range.

28. The automatic door operator as claimed in claim 1, wherein:

said obstruction detector is further operative to stop the motor to stop movement of the door upon detection of an obstruction when the motor is opening the door, and stop and reverse the motor to stop and reverse movement of the door upon detection of an obstruction when the motor is closing the door.

29. An automatic door operator for controlling a motor coupled for closing and opening a door, said automatic door operator comprising:

a rotation pulse generator coupled to a rotating shaft of the motor for producing electrical pulses corresponding to rotation of the shaft of the motor;

an operator settable closing torque limit input device for selecting a closing torque limit;

an operator settable opening torque limit input device for selecting an opening torque limit;

a travel counter connected to said rotation pulse generator for counting said electrical pulses;

a close travel memory for storing therein a close travel count corresponding to movement of the door to a fully closed position;

an open travel memory for storing therein an open travel count corresponding to movement of the door to a fully opened position; and a controller connected to said rotation pulse generator, said closing torque limit input device, said opening torque limit input device, said travel counter, said close travel memory and said open travel memory for controlling the motor to open and close the door, said controller including means operative to stop the motor to stop movement of the door when said count of said travel counter reaches said close travel count when closing the door, stop the motor to stop movement of the door when said count of said travel counter reaches said open travel count when opening the door;

detect the motor speed from said electrical pulses of said rotation pulse generator, at least stop the motor to stop movement of the door when the detected motor speed indicates a closing motor torque greater than said selected closing torque limit when the motor is closing the door, and at least stop the motor to stop movement of the door when the detected motor speed indicates an opening motor torque greater than said selected opening torque limit when the motor is opening the door.

30. The automatic door operator as claimed in claim 29, wherein said automatic door operator may optionally be installed for operation on 60 Hz AC power or 50 Hz AC power, and wherein:

the number of electrical pulses per each rotation of the shaft of the motor of said rotation pulse generator is selectable in manufacture, the selected number being a first number of pulses if said automatic garage door operator is installed for operation on 50 Hz AC power and being a second number of pulses if said automatic garage door operator is installed for operation on 60 Hz AC power, said second number of pulses being one fifth more than said first number of pulses.

31. The automatic door operator as claimed in claim 30, wherein:
said first number of pulses is 10 and said second number of pulses is 12.

32. The automatic door operator as claimed in claim 29, wherein:
said rotation pulse generator includes
a multipole magnet disposed for rotation with rotation of the shaft of the motor, and
at least one magnetic detector disposed in proximity to said multipole magnet for generating one of said electrical pulses upon rotation of each pole of said multipole magnet past said at least one magnetic detector.

33. The automatic door operator as claimed in claim 32, wherein:
said at least one magnetic detector comprises a Hall effect sensor.

34. The automatic door operator as claimed in claim 29, further comprising:
an adaptive closing torque limit memory for storing a adaptive closing torque limit for each of a plurality of regions of door closing travel;
an adaptive opening torque limit memory for storing an adaptive opening torque limit for each of a plurality of regions of door opening travel; and
said controller being further connected to said adaptive closing torque limit memory and said adaptive opening torque limit memory, said controller being further operative to
determine the current region within said plurality of regions door closing travel from a count of said travel counter when the motor is closing the door,
determine the current region within said plurality of regions door opening travel from said count of said travel counter when the motor is opening the door,
store in said adaptive closing torque limit memory for each of said plurality of regions of door closing travel a new adaptive closing torque limit upon each closing of the door, said new adaptive closing torque limit being a weighted sum of said prior adaptive closing torque limit for the corresponding region of door closing travel and the actual torque corresponding to an average motor speed signal for said region of door closing travel,
store in said adaptive opening torque limit memory for each of said plurality of regions of door opening travel a new adaptive opening torque limit upon each opening of the door, said new adaptive opening torque limit being a weighted sum of said prior adaptive opening torque limit memory for the corresponding region of door closing travel and the actual torque corresponding to an average motor speed signal for the said region of door opening travel,
at least stop the motor to stop movement of the door when the detected motor speed indicates a closing motor torque greater than the lesser of 1) said closing torque limit selected by said operator settable closing torque limit input device and 2) said adaptive closing torque limit stored in adaptive closing torque limit memory for the current region of door closing travel said when the motor is closing the door, and
at least stop the motor to stop movement of the door when the detected motor speed indicates an opening motor torque greater than the lesser of 1) said opening torque limit selected by said operator settable opening torque limit input device and 2) said adaptive opening torque limit stored in adaptive opening torque limit memory for the current region of door opening travel when the motor is opening the door.

35. The automatic door operator as claimed in claim 34, wherein:
said controller being further operative to
calculate said new adaptive closing torque limit as follows:

$$ACL_{(i,new)} = (1 - W_c) \times ACL_{(i,old)} + W_c \times M_c \times Sp$$

where: $ACL_{(i,new)}$ is the new adaptive closing torque limit for region i; $W_c$ is a closing weighing factor, $0 < W_c < 1$; $ACL_{(i,old)}$ is the prior adaptive closing torque limit for region i; $M_c$ is a closing margin factor greater than 1; and Sp is the average motor speed during closing within region i, and
calculate said new adaptive opening torque limit as follows:

$$AOL_{(i,new)} = (1 - W_o) \times AOL_{(i,old)} + W_o \times M_o \times Sp$$

where: $AOL_{(i,new)}$ is the new adaptive opening torque limit for region i; $W_o$ is a opening weighing factor, $0 < W_o < 1$; $AOL_{(i,old)}$ is the prior adaptive opening torque limit for region i; $M_o$ is a opening margin factor greater than 1; and Sp is the average motor speed during opening within region i.

36. The automatic door operator as claimed in claim 29, further comprising:
a closing torque rate of change limit memory for storing a closing torque rate of change limit for each of a plurality of regions of door closing travel;
an opening torque rate of change limit memory for storing an opening rate of change torque limit for each of a plurality of regions of door opening travel; and
said controller being further connected to said travel counter, said closing torque rate of change limit memory and said opening torque rate of change limit memory, said obstruction detector being further operative to
determine the current region within said plurality of regions door closing travel from a count of said travel counter when the motor is closing the door,
determine the current region within said plurality of regions door opening travel from said count of said travel counter when the motor is opening the door,
continuously determine the rate of change of motor speed when the motor is closing the door,
when the motor is closing the door at least stop the motor to stop movement of the door when the detected rate of change of motor speed indicates a closing rate of change of motor torque greater than said closing torque rate of change limit stored in said closing torque rate of change limit memory for the current region of door closing travel, continuously determine the rate of change of motor speed when the motor is opening the door, and when the motor is opening the door at least stop the motor to stop movement of the door when the detected rate of change of motor speed indicates an opening rate of change of motor torque greater than said opening torque rate of change limit stored in said opening torque rate of change limit memory for the current region of door opening travel.

37. The automatic door operator as claimed in claim 29, further comprising:

an operator settable close travel count input device for setting said close travel count; and an operator settable open travel count input device for setting said open travel count.

38. The automatic door operator as claimed in claim 37, wherein:

said operator settable close travel count input device consists of a close limit momentary contact push button switch coupled to said controller;

said operator settable open travel count input device consists of an open limit momentary contact push button switch coupled to said controller;

said controller being further operative to advance said close travel count of said close travel memory toward more fully closed if said close limit momentary contact push button switch is activated when the motor is closing the door, and advance said open travel count of said open travel memory toward more fully open if said open limit momentary contact push button switch is activated when the motor is opening the door.

39. The automatic door operator as claimed in claim 37, wherein:

said operator settable close travel count input device consists of a close limit momentary contact push button switch coupled to said controller;

said operator settable open travel count input device consists of an open limit momentary contact push button switch coupled to said controller;

said controller being further operative to store an indication of the last direction of movement of the motor if the motor is not operating, advance said close travel count of said close travel memory toward more fully closed if said close limit momentary contact push button switch is activated when the motor is closing the door, and when the motor is stopped and last direction of movement of the motor was closing the door, advance said close travel count of said close travel memory toward less fully closed if said close limit momentary contact push button switch is activated when the motor is opening the door, and when the motor is stopped and last direction of movement of the motor was opening the door, advance said open travel count of said open travel memory toward more fully opened if said open limit momentary contact push button switch is activated when the motor is opening the door, and when the motor is stopped and last direction of movement of the motor was opening the door, and advance said open travel count of said open travel memory toward less fully opened if said open limit momentary contact push button switch is activated when the motor is closing the door, and when the motor is stopped and last direction of movement of the motor was closing the door.

40. The automatic door operator as claimed in claim 37, wherein:

said operator settable close travel count input device consists of a close limit momentary contact push button switch coupled to said controller;

said operator settable open travel count input device consists of an open limit momentary contact push button switch coupled to said controller;

said controller being further operative to advance said close travel count of said close travel memory toward more fully closed upon activation of said close limit momentary contact push button switch, and advance said open travel count of said open travel memory toward more fully open upon activation of said open limit momentary contact push button switch, and reset said close travel count of said close travel memory to a first predetermined count and reset said open travel count of said open travel memory to a second predetermined count nearer fully open that said first predetermined count upon simultaneous activation of both said close limit momentary contact push button switch and said open limit momentary contact push button switch.

41. The automatic door operator as claimed in claim 37, wherein:

said operator settable close travel count input device consists of a close limit three position switch coupled to said controller having first and second momentary contact positions and a center off position;

said operator settable open travel count input device consists of an open limit button switch coupled to said controller having first and second momentary contact positions and a center off position;

said controller being further operative to advance said close travel count of said close travel memory toward more fully closed upon activation of said first momentary contact position of said close limit switch, advance said close travel count of said close travel memory toward less fully closed upon activation of said second momentary contact position of said close limit switch, advance said open travel count of said open travel memory toward more fully open upon activation of said first momentary contact position of said close limit switch, and advance said open travel count of said open travel memory toward less fully open upon activation of said second momentary contact position of said close limit switch.

42. The automatic door operator as claimed in claim 37, wherein:

said travel counter has a predetermined count range greater than the expected maximum number of said rotation pulses generated during travel between said fully closed position and said fully open position;

said close travel memory has said predetermined count range;

said open travel memory has said predetermined count range;

said automatic door operator further comprising:
a travel count reset means connected to said travel counter for setting the count within said travel counter to a predetermined number approximately half of said predetermined count range upon initial application of electric power to said automatic door operator.

43. The automatic door operator as claimed in claim 42, further comprising:
an open limit count reset means connected to said open travel memory for setting the count within said open travel memory to an open limit count reset number not greater than said predetermined number of said travel count reset means: and
a close limit reset means connected to said close travel memory for setting the count within said close travel memory to a close limit count reset number greater than said predetermined number of said travel count reset means.

44. The automatic door operator as claimed in claim 29, further comprising:
a backup power supply for powering at least said rotation pulse generator and said travel counter during failure of primary electric power.

45. The automatic door operator as claimed in claim 29, further comprising:
an electrically alterable programmable read only memory for storing predetermined data including at least said close travel count memory and said open travel count memory, said electrically alterable programmable read only memory having data storage capacity at least twice as great as required by said predetermined data; and
a write cycle means connected to said electrically alterable programmable read only memory operative to
count the number of write cycles said electrically alterable programmable read only memory, and
transfer said predetermined data to a previously unused portion of said electrically alterable programmable read only memory, change all access of said predetermined data to said previously unused portion of said electrically alterable programmable read only memory, and reset said count of the number of write cycles when said count of the number of write cycles exceeds a predetermined number.

46. An automatic door operator for controlling a motor coupled for closing and opening a door, said automatic door operator comprising:
a rotation pulse generator coupled to a rotating shaft of the motor for producing electrical pulses corresponding to rotation of the shaft of the motor;
a travel counter connected to said rotation pulse generator for counting said electrical pulses, said travel counter having a predetermined count range;
a close travel memory for storing therein a close travel count corresponding to movement of the door to a fully closed position, said close travel count having said predetermined count range;
an open travel memory for storing therein an open travel count corresponding to movement of the door to a fully opened position, said open travel count having said predetermined count range;
a counter reset load means connected to said travel counter, said close travel memory and said open travel memory operative upon each initial application of electric power to said automatic door operator to
set said travel count in said travel counter to a first predetermined number near the middle of said predetermined count range,
set said close travel count in said close travel memory to a second predetermined number not greater than said first predetermined number, and
set said open travel count in said open travel memory to a third predetermined number greater than said first predetermined number;
a controller connected to said close travel memory and said open travel memory and operative to
stop the motor to stop movement of the door when said count of said travel counter reaches said close travel count when closing the door, and
stop the motor to stop movement of the door when said count of said travel counter reaches said open travel count when opening the door.

47. The automatic door operator as claimed in claim 46, further comprising:
an operator settable close travel count input device for setting said close travel count;
an operator settable open travel count input device for setting said open travel count.

48. The automatic door operator as claimed in claim 47, wherein:
said operator settable close travel count input device consists of a close limit momentary contact push button switch coupled to said controller:
said operator settable open travel count input device consists of an open limit momentary contact push button switch coupled to said controller:
said controller being further operative to
advance said close travel count of said close travel memory toward more fully closed if said close limit momentary contact push button switch is activated when the motor is closing the door, and
advance said open travel count of said open travel memory toward more fully open if said open limit momentary contact push button switch is activated when the motor is opening the door.

49. The automatic door operator as claimed in claim 47, wherein:
said operator settable close travel count input device consists of a close limit momentary contact push button switch coupled to said controller:
said operator settable open travel count input device consists of an open limit momentary contact push button switch coupled to said controller:
said controller being further operative to
store an indication of the last direction of movement of the motor if the motor is not operating,
advance said close travel count of said close travel memory toward more fully closed if said close limit momentary contact push button switch is activated when the motor is closing the door and when the motor is stopped and last direction of movement of the motor was closing the door,
advance said close travel count of said close travel memory toward less fully closed if said close limit momentary contact push button switch is activated when the motor is opening the door and when the motor is stopped and last direction of movement of the motor was opening the door, advance said open travel count of said open travel memory toward more fully opened if said open limit momentary contact push button switch is activated when the motor is opening the door and when the motor is stopped and last direction of movement of the motor was opening the door, and advance said open travel count of said open travel memory toward less fully opened if said open limit momentary contact push button switch is activated when the motor is closing the door and when the motor is stopped and last direction of movement of the motor was closing the door.

50. The automatic door operator as claimed in claim 46, wherein:

said operator settable close travel count input device consists of a close limit momentary contact push button switch coupled to said controller:

said operator settable open travel count input device consists of an open limit momentary contact push button switch coupled to said controller:

said controller being further operative to advance said close travel count of said close travel memory toward more fully closed upon activation of said close limit momentary contact push button switch, and advance said open travel count of said open travel memory toward more fully open upon activation of said open limit momentary contact push button switch, and reset said close travel count of said close travel memory to a first predetermined count and reset said open travel count of said open travel memory to a second predetermined count nearer fully open that said first predetermined count upon simultaneous activation of both said close limit momentary contact push button switch and said open limit momentary contact push button switch.

51. The automatic door operator as claimed in claim 46, wherein:

said operator settable close travel count input device consists of a close limit three position switch coupled to said controller having first and second momentary contact positions and a center off position;

said operator settable open travel count input device consists of an open limit button switch coupled to said controller having first and second momentary contact positions and a center off position;

said controller being further operative to advance said close travel count of said close travel memory toward more fully closed upon activation of said first momentary contact position of said close limit switch, advance said close travel count of said close travel memory toward less fully closed upon activation of said second momentary contact position of said close limit switch, advance said open travel count of said open travel memory toward more fully open upon activation of said first momentary contact position of said close limit switch, and advance said open travel count of said open travel memory toward less fully open upon activation of said second momentary contact position of said close limit switch.

52. The automatic door operator as claimed in claim 46, further comprising:

a backup power supply for powering at least said rotation pulse generator and said travel counter during failure of primary electric power.

53. The automatic door operator as claimed in claim 46, further comprising:

an electrically alterable programmable read only memory for storing predetermined data including at least said close travel count memory and said open travel count memory, said electrically alterable programmable read only memory having data storage capacity at least twice as great as required by said predetermined data; and a write cycle means connected to said electrically alterable programmable read only memory operative to count the number of write cycles to said electrically alterable programmable read only memory, and transfer said predetermined data to a previously unused portion of said electrically alterable programmable read only memory, change all access of said predetermined data to said previously unused portion of said electrically alterable programmable read only memory, and reset said count of the number of write cycles when said count of the number of write cycles exceeds a predetermined number.

* * * * *